US010633112B2

(12) United States Patent
Yamada et al.

(10) Patent No.: US 10,633,112 B2
(45) Date of Patent: Apr. 28, 2020

(54) FLYING MACHINE, METHOD FOR USING FLYING MACHINE, AND FLYING MACHINE FRAME

(71) Applicant: FUJITSU LIMITED, Kawasaki-shi, Kanagawa (JP)

(72) Inventors: Moyuru Yamada, Machida (JP); Yoshiro Hada, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 365 days.

(21) Appl. No.: 15/491,466

(22) Filed: Apr. 19, 2017

(65) Prior Publication Data
US 2017/0297681 A1 Oct. 19, 2017

(30) Foreign Application Priority Data

Apr. 19, 2016 (JP) .................................. 2016-083808
Mar. 6, 2017 (JP) .................................. 2017-042215

(51) Int. Cl.
*B64C 25/32* (2006.01)
*B64D 47/08* (2006.01)
*B64C 39/02* (2006.01)

(52) U.S. Cl.
CPC ............ *B64D 47/08* (2013.01); *B64C 39/024* (2013.01); *B64C 2025/325* (2013.01); *B64C 2201/027* (2013.01); *B64C 2201/108* (2013.01); *B64C 2201/127* (2013.01); *B64C 2201/18* (2013.01)

(58) Field of Classification Search
CPC .......... B64C 2201/12; B64C 2201/123; B64C 2201/127; B64C 39/02; B64C 39/24; B64C 25/32; B64C 27/04; B64D 43/00; B64D 45/00; B64D 47/00; B64D 47/08
See application file for complete search history.

(56) References Cited

U.S. PATENT DOCUMENTS

2018/0290748 A1* 10/2018 Corban ................. B64C 39/024

FOREIGN PATENT DOCUMENTS

| JP | 2003-236776 | 8/2003 |
| JP | 2009-113782 | 5/2009 |
| JP | 2015-117003 | 6/2015 |
| JP | 2016-26946 | 2/2016 |
| JP | 2016-168861 | 9/2016 |

OTHER PUBLICATIONS

English Abstract of Japanese Publication No. 2016-168861 published Sep. 23, 2016.
English Abstract of Japanese Publication No. 2016-26946 published Feb. 18, 2016.
English Abstract of Japanese Publication No. 2003-236776 published Aug. 26, 2003.
English Abstract of Japanese Publication No. 2009-113782 published May 28, 2009.
English Abstract of Japanese Publication No. 2015-117003 published Jun. 25, 2015.

* cited by examiner

*Primary Examiner* — J. Woodrow Eldred
(74) *Attorney, Agent, or Firm* — Staas & Halsey LLP

(57) ABSTRACT

A flying machine includes a flying machine body including a rotor blade; a frame including a frame body supporting the flying machine body, and a pressing section that is pressed against a target object at least at two locations separated along a direction orthogonal to a width direction of the frame body; and a detector fixed to the frame, and having a detection direction that is a direction orthogonal to a direction joining the two locations together and facing toward the target object.

20 Claims, 31 Drawing Sheets

FIG. 10
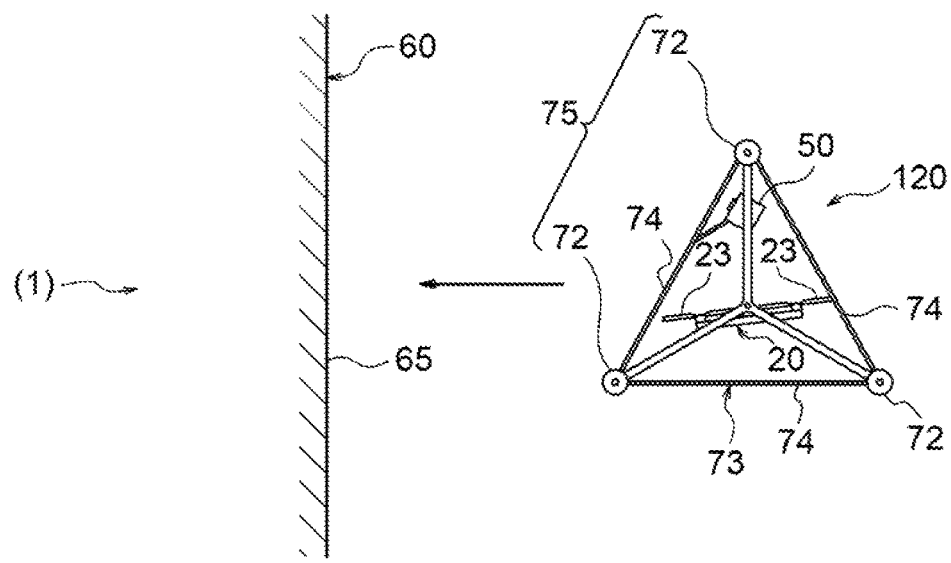
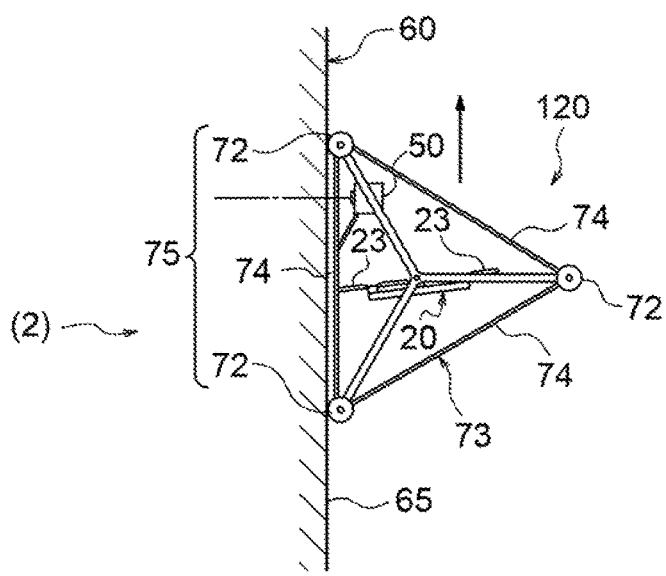

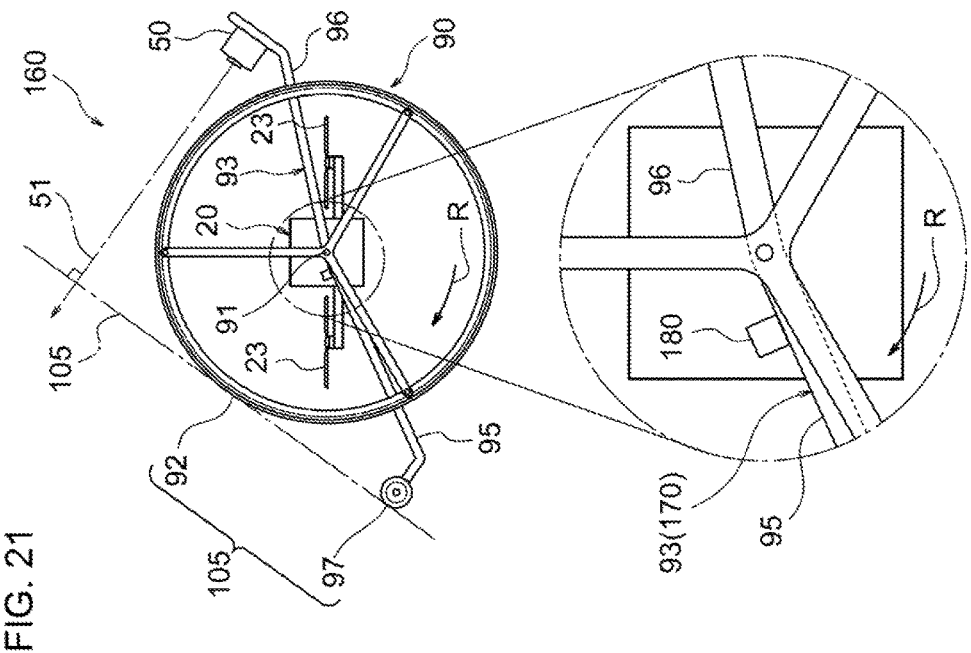
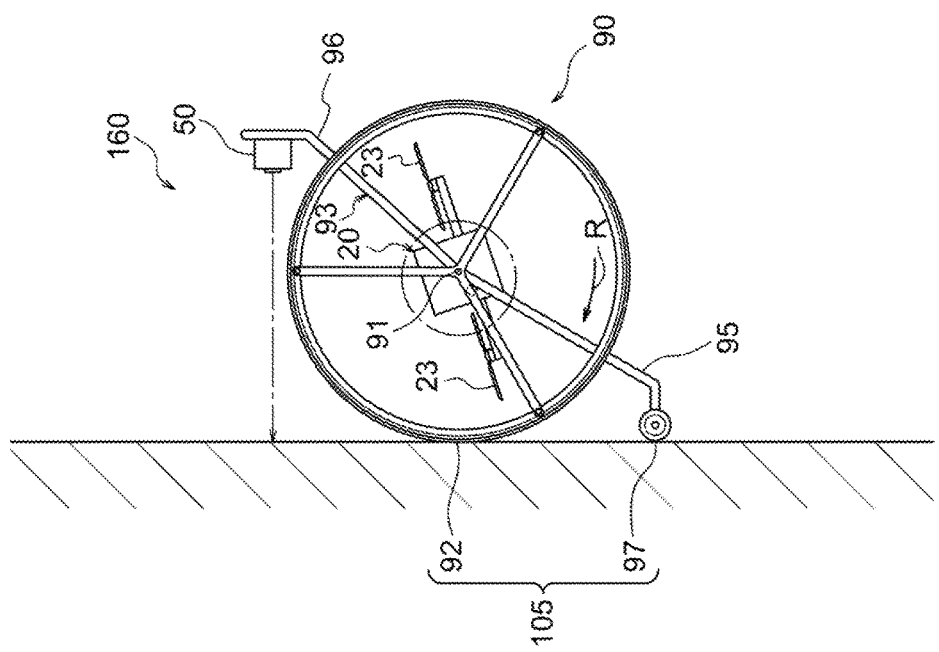
FIG. 21

FIG. 25
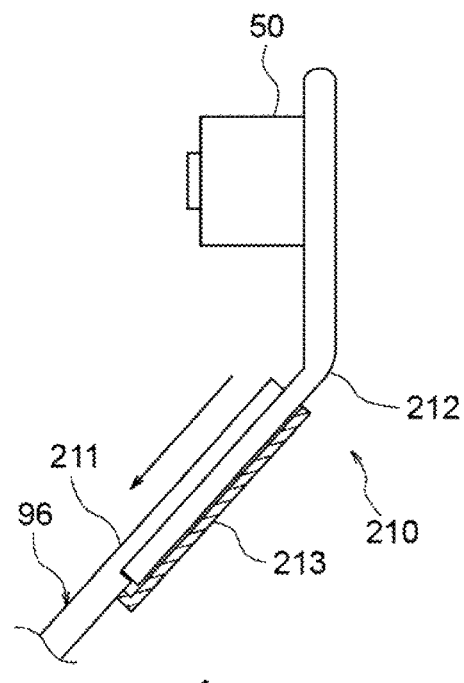
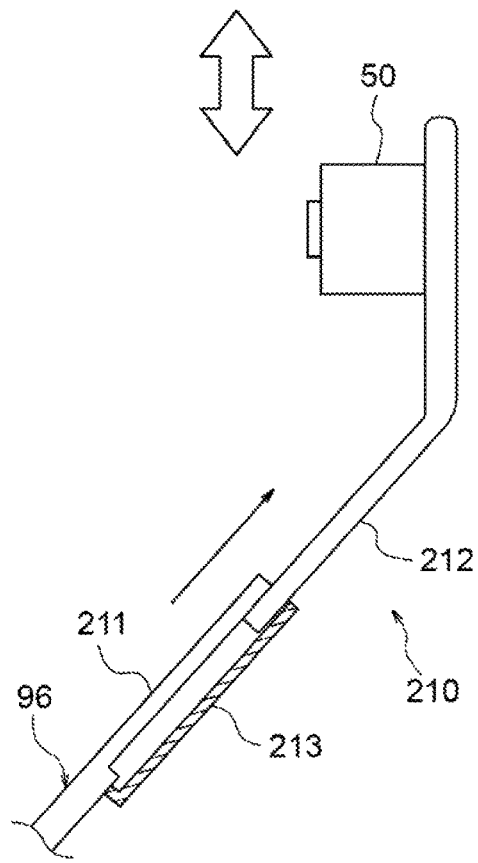

FIG. 26
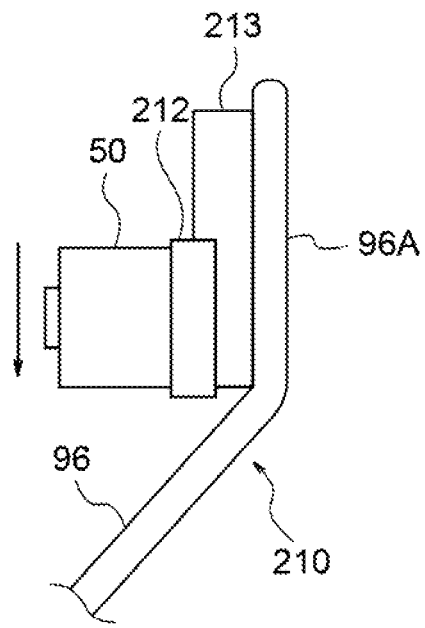
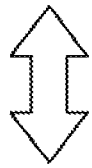
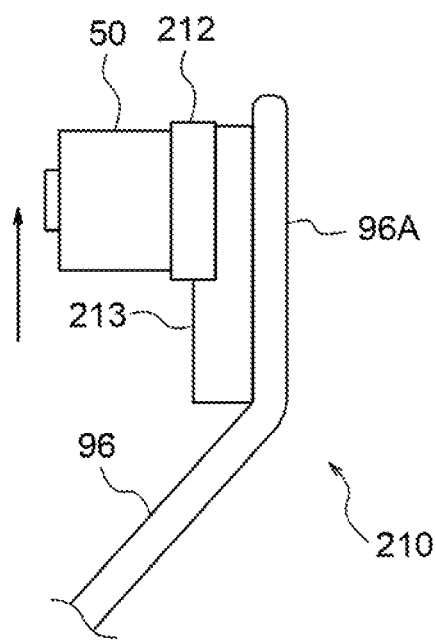

FIG. 27
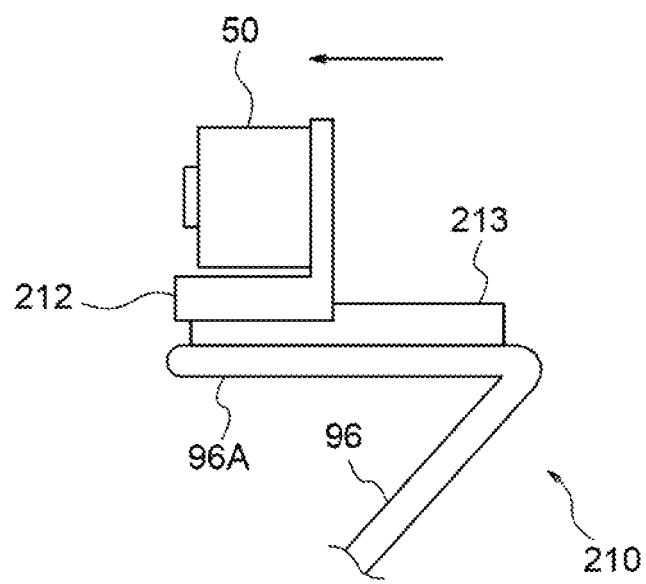
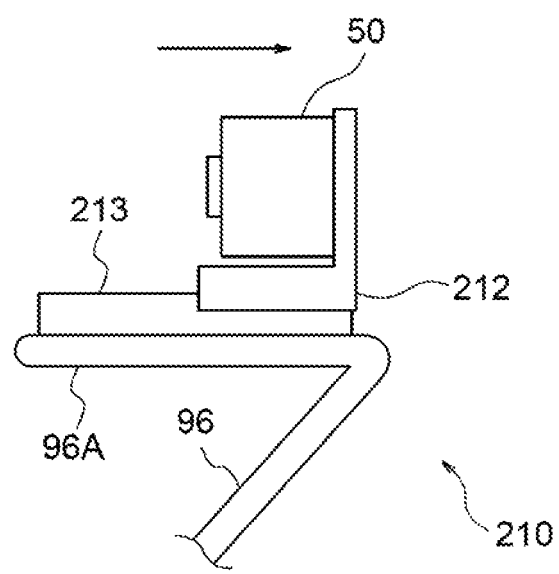

FLYING MACHINE, METHOD FOR USING FLYING MACHINE, AND FLYING MACHINE FRAME

CROSS-REFERENCE TO RELATED APPLICATION

This application is based upon and claims the benefit of priority of the prior Japanese Patent Application No. 2016-483808, filed on Apr. 19, 2016, and No. 2017-042215, filed on Mar. 6, 2017, the entire contents of which are incorporated herein by reference.

FIELD

Technology disclosed herein relates to a flying machine with rotor blades, a method for using the flying machine, and a flying machine frame.

BACKGROUND

Recently, flying machines that perform operations such as still photography or recording video footage with a camera during unmanned flight have been coming into use. As such a flying machine, a proposal exists for a flying machine including a flying machine body with rotor blades and a pair of wheels that are capable of rotating with respect to the flying machine body (see, for example, Patent Document 1). Note that Patent Documents 2 and 3 describe technology relating to wheel support mechanisms.

RELATED PATENT DOCUMENTS

Patent Document 1: Japanese Laid-Open Patent Publication No. 2015-117003
Patent Document 2: JP-A No. 2009-113782
Patent Document 3: Japanese Laid-Open Patent Publication No. 2003-236776

SUMMARY

According to an aspect of the embodiments, a flying machine includes a flying machine body including a rotor blade, a frame including a frame body supporting the flying machine body, and a pressing section that is pressed against a target object at least at two locations separated along a direction orthogonal to a width direction of the frame body, and a detector fixed to the frame, and having a detection direction that is a direction orthogonal to a direction joining the two locations together and facing toward the target object.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of a method for using a flying machine of the second exemplary embodiment;
FIG. 21 is a diagram illustrating a third modified example of a flying machine according to the sixth exemplary embodiment;
FIG. 25 is an enlargement illustrating an extendable mechanism illustrated in FIG. 24;
FIG. 26 is a diagram illustrating another example of an extendable mechanism applied in the sixth modified example;
FIG. 27 is a diagram illustrating another example of an extendable mechanism applied in the sixth modified example.

DESCRIPTION OF EMBODIMENTS

First Exemplary Embodiment

Figure 1:
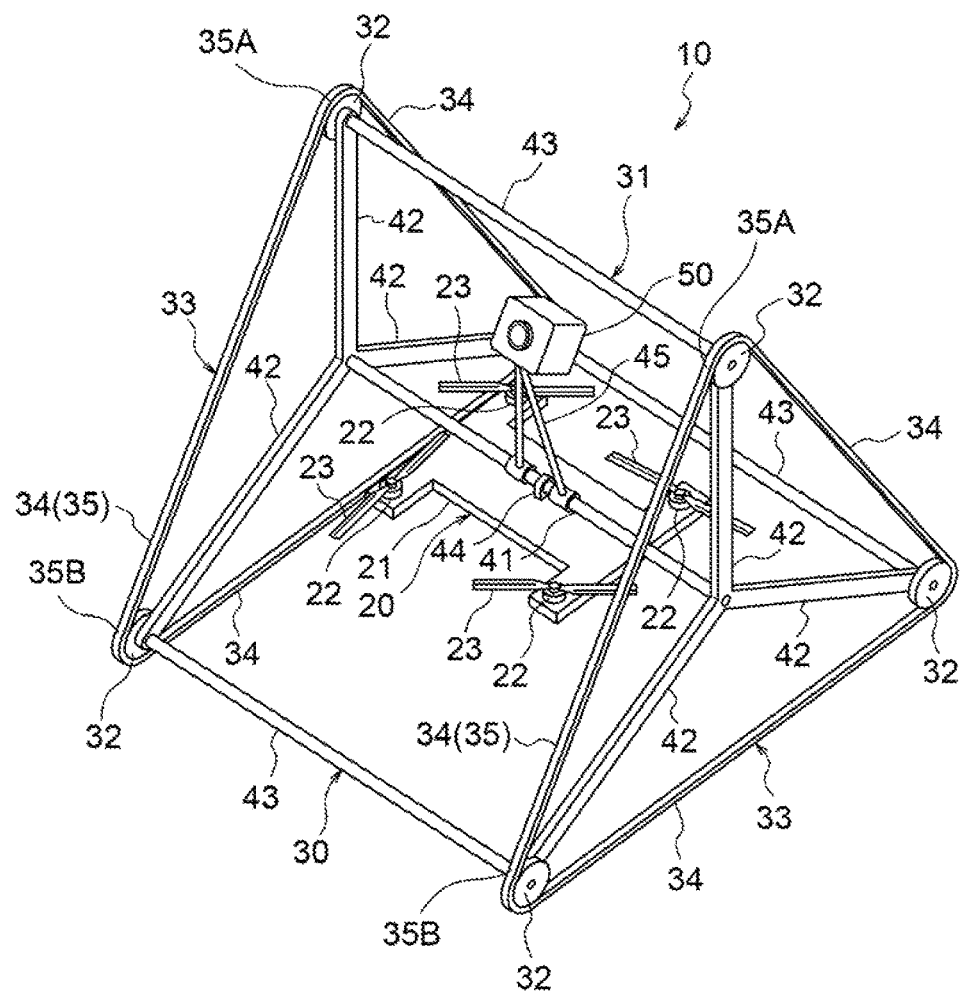
FIG. 1 is a perspective view of a flying machine according to a first exemplary embodiment.

First, explanation follows regarding a first exemplary embodiment of technology disclosed herein.

As illustrated in FIG. 1 to FIG. 4, a flying machine 10 according to the first exemplary embodiment includes a flying machine body 20, a frame 30, and a camera 50.

The flying machine body 20 is, for example, a multicopter, and includes a base 21, plural motors 22, and plural rotor blades 23. In the present exemplary embodiment, as an example, there are four each of the plural motors 22 and the plural rotor blades 23.

The base 21 has an H-shape in plan view. The plural motors 22 are respectively disposed at the four corners of the base 21. The plural motors 22 and the plural rotor blades 23 are each disposed with their axial directions running along a height direction of the flying machine 10. The plural rotor blades 23 are fixed to output shafts of the respective motors 22. The base 21 is provided with a control circuit for controlling the plural motors 22, and a battery or the like for supplying electric power to the plural motors 22.

The frame 30 includes a frame body 31, plural pulleys 32, and a pair of looped belts 33. The frame body 31 also includes a central support rod 41, plural side face support rods 42, and plural coupling rods 43.

The central support rod 41 extends in a width direction of the frame body 31. An attachment member 44 is fixed to the central support rod 41 at a central portion of the central support rod 41 so as to capable of rotating about the axial direction of the central support rod 41. The flying machine body 20 is fixed to the attachment member 44. The flying machine body 20 is supported by the central support rod 41 through the attachment member 44 so as to be capable of rotating about the axial direction of the central support rod 41, namely about a width direction of the frame body 31. The flying machine body 20 is disposed at a lower side of the central support rod 41.

The plural side face support rods 42 are respectively provided at both end portions of the central support rod 41. The frame body 31 has left-right symmetry, and in the present exemplary embodiment, there are, for example, three of the side face support rods 42 provided on each side of the central support rod 41. The three side face support rods 42 on each side each extend in a direction orthogonal to the axial direction of the central support rod 41, and are the same length as each other. Moreover, the three side face support rods 42 on each side are disposed at uniform angle spacings (spaced 120° apart) about the axial direction of the central support rod 41, and extend in a radiating pattern centered on the central support rod 41.

The plural coupling rods 43 each extend in the width direction of the frame body 31. The number of the plural coupling rods 43 provided is the same as the number of the side face support rods 42 on each side, so in the present exemplary embodiment, there are three of the plural coupling rods 43. Both end portions of each of the three coupling rods 43 are each respectively fixed to leading end portions of the three side face support rods 42 on each respective side.

The plural pulleys 32 are respectively provided at both width direction end portions of the frame body 31. The number of the plural pulleys 32 on each side is the same as the number of the side face support rods 42 on each side, so in the present exemplary embodiment, there are three of the plural pulleys 32 on each side. The three pulleys 32 on each side are respectively provided corresponding to the leading end portions of the respective side face support rods 42, and are disposed spaced apart about the width direction of the frame body 31.

More specifically, both end portions of the three coupling rods 43 described above each penetrate the respective leading end portions of the three side face support rods 42 on each side, and the three pulleys 32 on each side are fixed to the respective end portions of the respective coupling rods 43 so as to be capable of rotating. Namely, the three coupling rods 43 are coupled to the three respective pulleys 32 provided at one width direction end portion of the frame body 31, and to the three respective pulleys 32 provided at the other width direction end portion of the frame body 31. Moreover, both end portions of each of the three coupling rods 43 are fixed to the respective leading end portions of the three respective side face support rods 42 on each side, such that the three coupling rods 43 are supported by the three respective side face support rods 42 on each side.

The pair of looped belts 33 are an example of a "pair of looped members", and are provided at both width direction end portions of the frame body 31. Each looped belt 33 has a thin plate shape, and is entrained around the three pulleys 32 on each side. Each looped belt 33 rotates accompanying rotation of the three pulleys 32 on each side. Moreover, since the three pulleys 32 on each side are disposed at uniform spacings about the width direction of the frame body 31, each looped belt 33 forms an equilateral triangular shape around the width direction of the frame body 31, as an example of a "polygonal shape".

Figure 2:
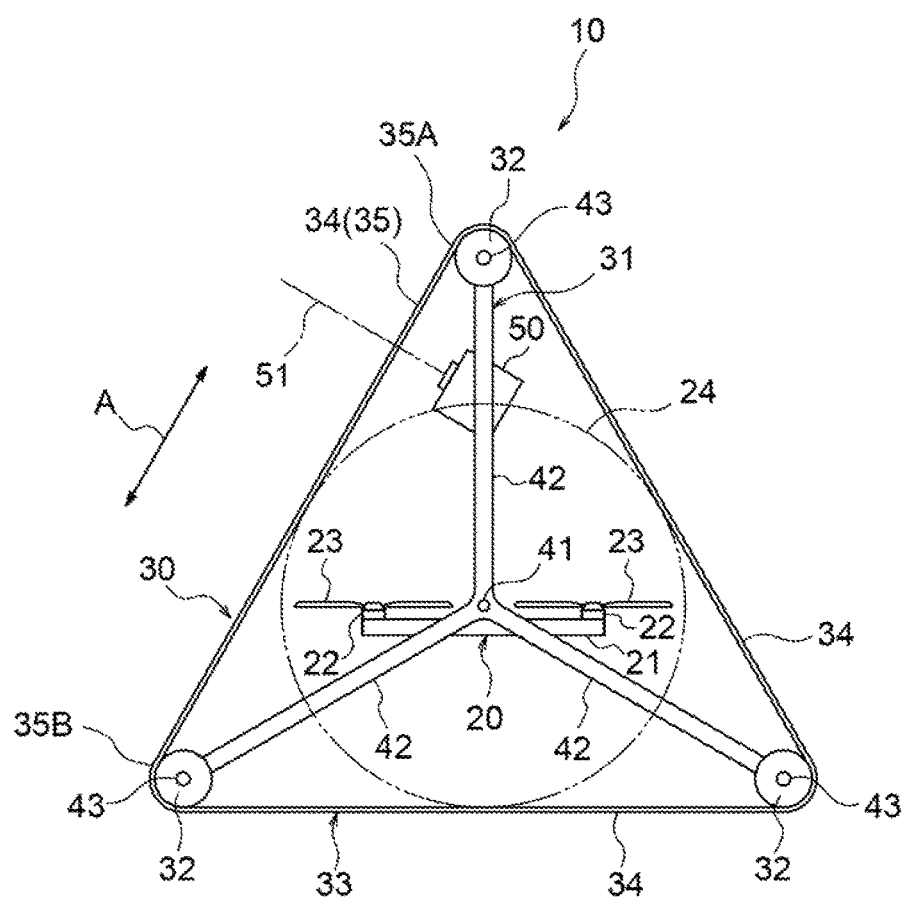
FIG. 2 is a side view of the flying machine in FIG. 1.
Figure 3:
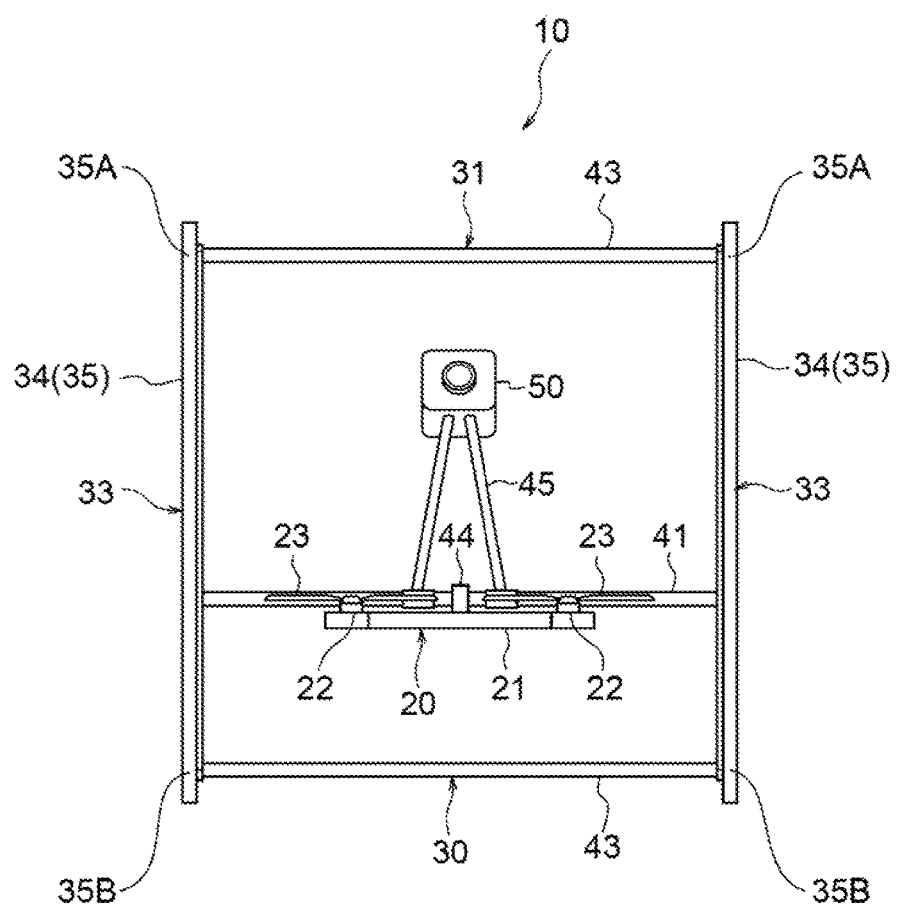
FIG. 3 is a front view of the flying machine in FIG. 1.
Figure 4:
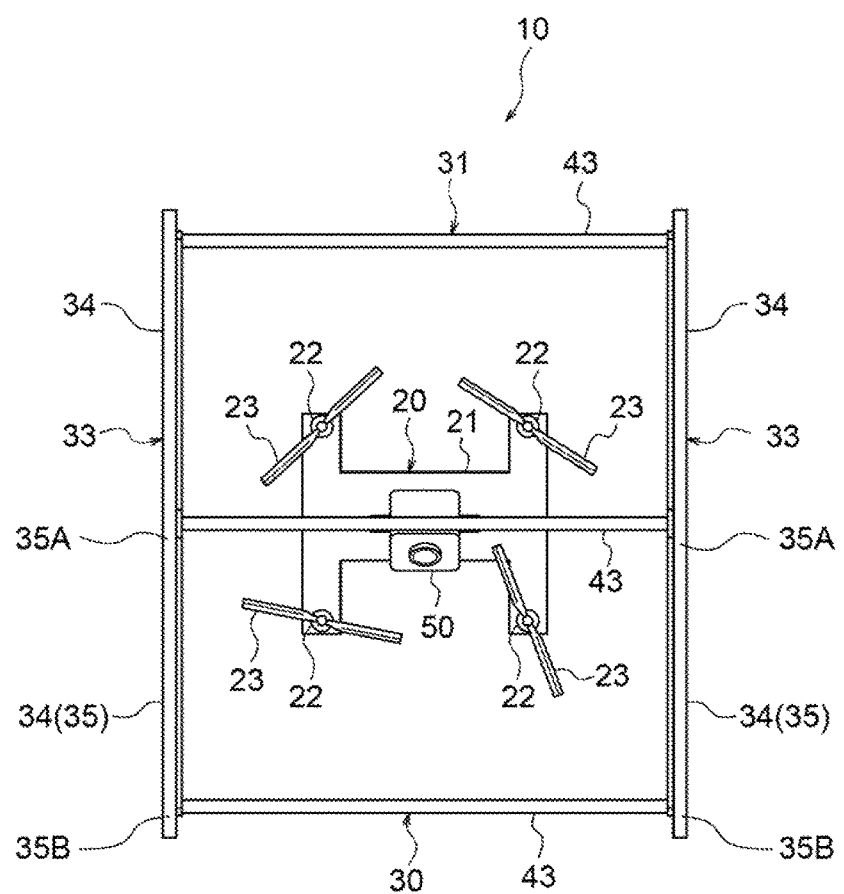
FIG. 4 is a plan view of the flying machine in FIG. 1.

As illustrated in FIG. 2, the looped belts 33 that form equilateral triangular shapes each have a size such that the flying machine body 20 is wholly contained within a circle 24 inscribed within the looped belts 33 as viewed from the side of the frame 30. The flying machine body 20 is positioned inside the looped belts 33 of the frame 30 as viewed from the side.

The frame 30 that includes the pair of looped belts 33 described above, the central support rod 41 described above, the plural side face support rods 42, and the plural coupling rods 43 is formed in a substantially tubular cage shape having an axial direction running along the width direction of the flying machine 10. The flying machine body 20 is disposed between the pair of looped belts 33 when the frame 30 is viewed face-on, and is disposed inside the looped belts 33 when the frame 30 is viewed from the side. The flying machine body 20 is thus enclosed within the frame 30 including the frame body 31 and the pair of looped belts 33.

The camera 50 is an example of a "detector". The camera 50 is fixed to the central support rod 41 of the frame 30 through legs 45. The legs 45 are an example of a "fixing section". The camera 50 is disposed at the upper side of the central support rod 41. Moreover, similarly to the flying machine body 20 described above, the camera 50 is disposed between the pair of looped belts 33 when the frame 30 is viewed face-on, and is disposed inside the looped belts 33 when the frame 30 is viewed from the side. The camera 50 is thus also enclosed within the frame 30.

As illustrated in FIG. 2, as viewed from the side of the frame 30 the direction in which the camera 50 faces is set such that its optical axis 51 runs orthogonal to one side 34 out of three sides 34 formed by the looped belts 33. Out of the three sides 34 formed by the respective looped belts 33, the side 34 to which the optical axis 51 of the camera 50 is orthogonal functions as a pressing section 35 that is pressed against a target object, as described later.

The pressing section 35 is formed not by a specific location on the rotating looped belts 33, but by a portion of each rotating looped belt 33 between a pair of the pulleys 32. In FIG. 1 to FIG. 4, as an example, the camera 50 faces obliquely forward and upward with respect to the frame 30, and the pressing sections 35 are formed by the sides 34 positioned between the pulleys 32 at the upper side and the pulleys 32 at the front side. The pressing sections 35 are each formed by one side 34, and are therefore linear in shape.

Accordingly, the pressing sections 35, each configured by the one side 34, are linear in shape, and so the pressing sections 35 are pressed against the target object such that the pressing sections 35 contact the target object over their entire length direction, including at two locations 35A, 35B on both length direction end sides. The pressing sections 35 are respectively configured by the pair of looped belts 33 on each respective side, such that the pressing sections 35 are provided at both width direction end portions of the frame body 31. Moreover, the pressing sections 35 are each formed by the one side 34, and therefore extend along a direction orthogonal to the width direction of the frame body 31. The two locations 35A, 35B at both length direction end sides of each pressing section 35 are separated from each other in a direction (the arrow A direction) orthogonal to the width direction of the frame body 31.

Moreover, as described above, as viewed from the side of the frame 30, the direction in which the camera 50 faces is set such that the optical axis 51 of the camera 50 runs orthogonal to the pressing section 35 configured by the one side 34. Accordingly, the optical axis direction of the camera 50, namely an imaging direction of the camera 50, is set in the direction in which the pressing sections 35 are pressed against the target object. The imaging direction of the camera 50 is, specifically, set as a direction orthogonal to the direction connecting between the two locations 35A. 35B at both length direction end sides of the pressing section 35 (the length direction of the one side 34), and facing toward the target object. The imaging direction of the camera 50 is an example of a "detection direction of the detector".

Next, explanation follows regarding an example of a method for using the flying machine 10 described above.

Figure 5:
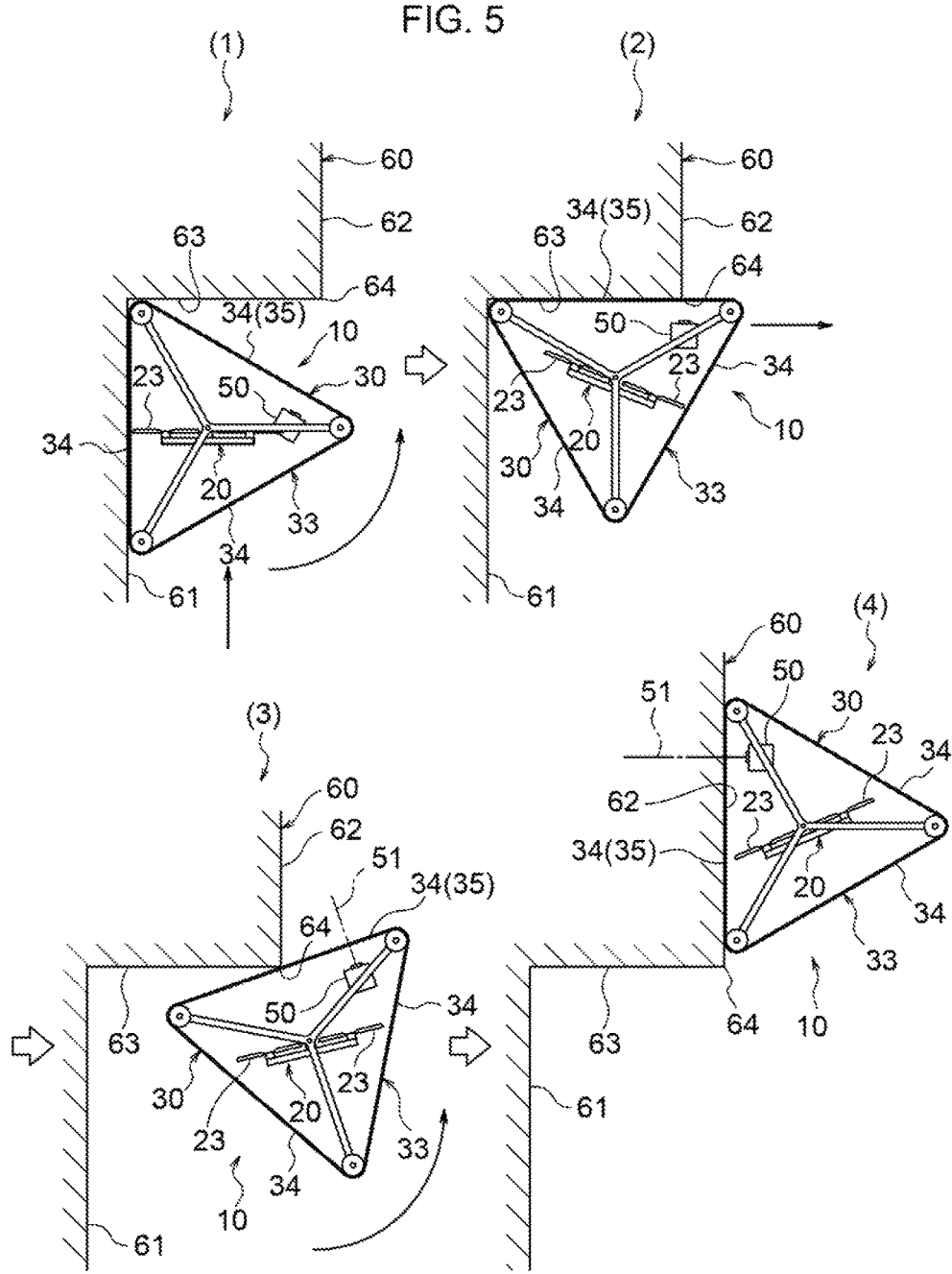
FIG. 5 is a diagram illustrating an example of a method for using the flying machine according to a first exemplary embodiment.
Figure 6:
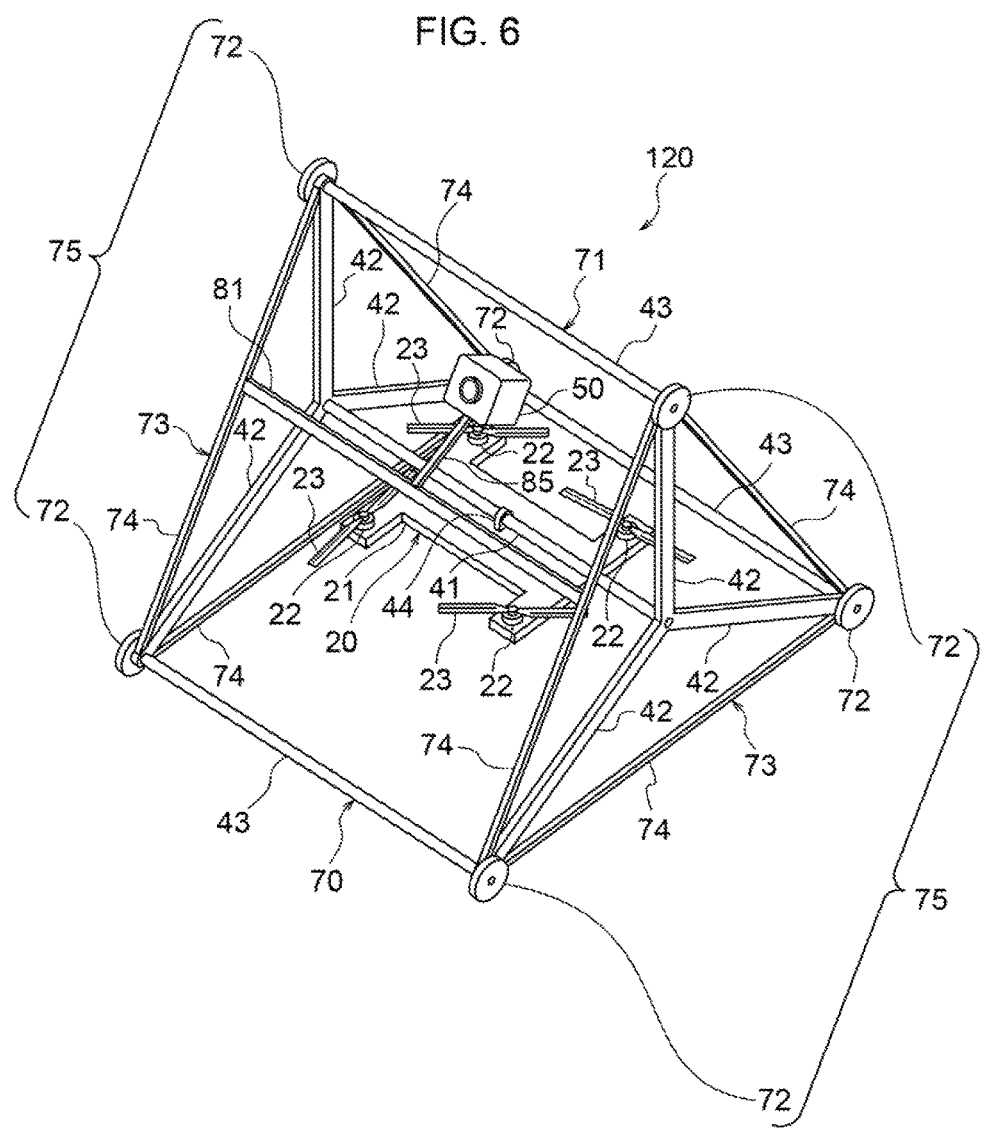
FIG. 6 is a perspective view of a flying machine according to a second exemplary embodiment.

FIG. 5 illustrates an example of a method for using the flying machine 10. The flying machine 10 flies based on signals transmitted from a controller operated by an operator. The signals transmitted from the controller may be sent to the flying machine 10 wirelessly, or may be sent to the flying machine 10 through a wire.

The target object 60 illustrated in FIG. 5 is, for example, a structure such as a bridge or a building. The target object 60 includes a lower vertical face 61, an upper vertical face 62, and a downward-facing horizontal face 63 formed between the vertical faces 61, 62.

In the present example, first, as illustrated by state (1), the flying machine 10 flies and one side 34 formed by each looped belt 33 makes contact with the vertical face 61 of the target object 60. The flying machine 10 ascends the vertical face 61 accompanying rotation of the looped belts 33.

The flying machine 10 ascends, and when the flying machine 10 reaches the horizontal face 63 of the target object 60, as illustrated by the transition from state (1) to state (2), the frame 30 rotates about one corner formed by the looped belts 33. Then, another side 34 formed by the looped belts 33 makes contact with the horizontal face 63 of the target object 60, and the flying machine 10 moves along the horizontal face 63 accompanying rotation of the looped belts 33.

The flying machine 10 then moves along the horizontal face 63, and when a central portion of the flying machine 10 passes a corner 64 of the target object 60, as illustrated by the transition from state (3) to state (4), the frame 30 rotates with the looped belts 33 maintaining contact with the corner 64. Yet another side 34 formed by the looped belts 33 then makes contact with the vertical face 62 of the target object 60.

Accordingly, in the flying machine 10 of the first exemplary embodiment, even when the target object 60 includes a step, the flying machine 10 rides over the step by rotating the frame 30 so as to change the faces of the looped belts 33 that contact the target object 60.

The sides 34 that contact the upper vertical face 62 of the target object 60 described above are orthogonal to the optical axis 51 of the camera 50, and function as the pressing sections 35. The flying machine 10 ascends accompanying rotation of the looped belts 33 in a state in which the pressing sections 35 are pressed against the vertical face 62 of the target object 60. Moreover, as described above, the direction in which the camera 50 faces is set such that the optical axis 51 runs orthogonal to the sides 34 serving as the pressing sections 35. The camera 50 images the vertical face 62 with the direction in which the pressing sections 35 are pressed against the vertical face 62 as the imaging direction.

Note that as illustrated by state (4), in order to press the pressing sections 35 against the vertical face 62, the flying machine body 20 adopts a tilted state such that thrust toward the side of the vertical face 62 acts on the flying machine 10.

However, in the present exemplary embodiment, the camera 50 is fixed to the frame 30, and moreover, the camera 50 is fixed to the frame 30 such that the direction in which the pressing sections 35 are pressed against the vertical face 62 corresponds to the imaging direction. Accordingly, the camera 50 is maintained in a state facing the vertical face 62 straight-on, even when the flying machine body 20 is tilted.

Next, explanation follows regarding operation and advantageous effects of the first exemplary embodiment.

Figure 30:
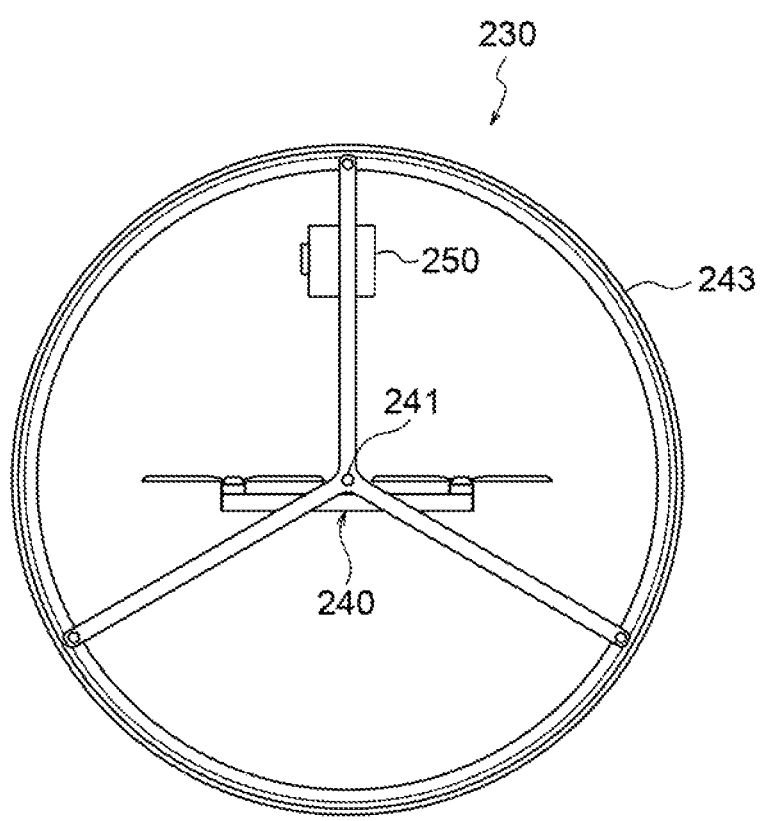
FIG. 30 a side view of a flying machine according to a comparative example.

First, explanation follows regarding a comparative example in order to explain the operation and advantageous effects of the first exemplary embodiment. FIG. 30 illustrates a flying machine 230 according to a comparative example. The configuration of the flying machine 230 according to the comparative example differs from the flying machine 10 (see FIG. 1) of the first exemplary embodiment described above in the following manner.

The flying machine 230 according to the comparative example includes a flying machine body 240, a pair of wheels 243, and a camera 250. The flying machine body 240 is configured similarly to the flying machine body 20 (see FIG. 1) of the first exemplary embodiment described above. The pair of wheels 243 are disposed on respective width direction sides of the flying machine body 240, and are rotatably supported by the flying machine body 240 through an axle shaft 241 extending in the width direction of the flying machine body 240. The camera 250 is fixed to the flying machine body 240 through legs. The camera 250 faces toward the front of the flying machine body 240.

Figure 31:
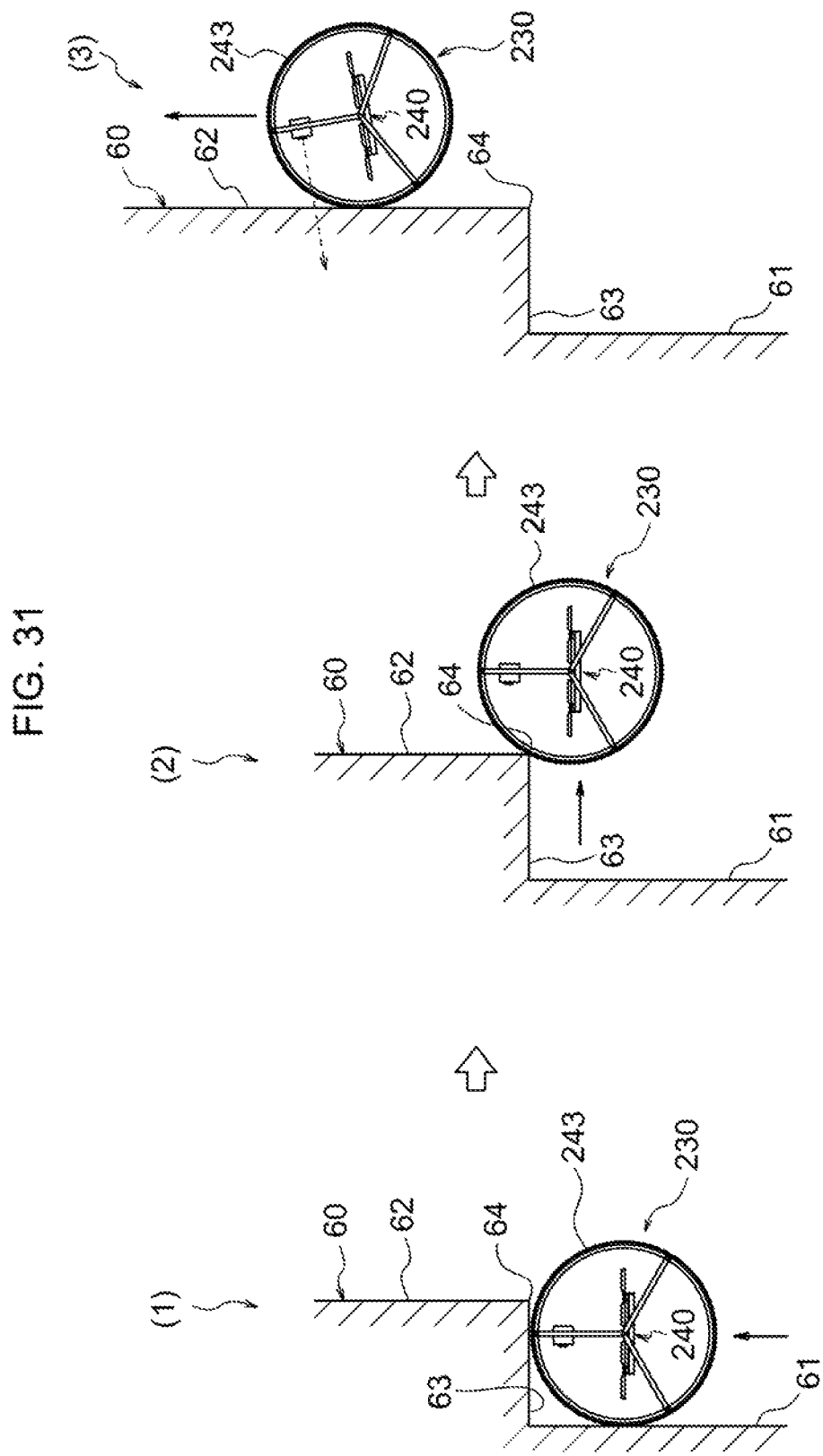
FIG. 31 is a diagram illustrating an example of a method for using a flying machine according to a comparative example.

FIG. 31 illustrates a method for using the flying machine 230 according to the comparative example. In the method for using the flying machine 230 according to the comparative example, first, as illustrated by state (1), the flying machine 230 flies, and the pair of wheels 243 come into contact with the vertical face 61 of the target object 60. The flying machine 230 then ascends the vertical face 61 accompanying rotation of the pair of wheels 243.

The flying machine 230 ascends, and when the flying machine 230 reaches the horizontal face 63 of the target object 60, the pair of wheels 243 come into contact with the horizontal face 63. The flying machine 230 then moves along the horizontal face 63 accompanying rotation of the pair of wheels 243.

The flying machine 230 then moves along the horizontal face 63, and on reaching the corner 64 of the target object 60, as illustrated by state (2), the flying machine 230 moves with the pair of wheels 243 maintaining contact with the corner 64. Then, as illustrated by state (3), the flying machine 230 comes into contact with the vertical face 62 of the target object 60, and the flying machine 230 images the vertical face 62 with the camera 250.

However, this comparative example has the following issue. Namely, in the comparative example, as illustrated by state (3), when the flying machine 230 is made to ascend the vertical face 62, the pair of wheels 243 are maintained in a state contacting the vertical face 62 when the flying machine body 240 is tilted such that thrust toward the side of the vertical face 62 acts on the flying machine 230. However, when the flying machine body 240 is tilted, the camera 250 also tilts together with the flying machine body 240 such that the camera 250 does not face the vertical face 62 straight on. This could reduce the imaging precision with respect to the vertical face 62.

Moreover, as illustrated by state (1), in the comparative example, if a step formed by the horizontal face 63 is larger than the radius of the wheels 243, the wheels 243 may be incapable of riding over the step when the flying machine 230 is simply made to ascend.

Moreover, as illustrated by state (2), the contact state between the pair of wheels 243 and the corner 64 of the target object 60 is line contact when the flying machine 230 moves from the horizontal face 63 to the vertical face 62. This complicates the size of the contact force and the directional control, and if the size of the contact force and the directional control are not appropriate, the pair of wheels 243 could easily come away from the corner 64. Moreover, if the pair of wheels 243 are not both in contact with the corner 64 at the same time, then one of the wheels 243 could catch on the corner 64, upsetting the orientation of the flying machine 230. Namely, in the flying machine 230 according to the comparative example, is it is difficult to achieve movement that follows irregularities on the target object.

However, in the flying machine 10 according to the first exemplary embodiment illustrated in FIG. 1 to FIG. 5, the camera 50 is fixed to the frame 30, and moreover, the camera 50 is fixed to the frame 30 with the direction in which the pressing sections 35 are pressed against the target object as the imaging direction. Accordingly, as illustrated by state (4) in FIG. 5, the camera 50 can be maintained in a state facing straight toward the target object in the state in which the pressing sections 35 are pressed against the target object, even when the flying machine body 20 tilts. This thereby enables the imaging precision with respect to the target object to be improved.

In the flying machine 10 according to the first exemplary embodiment, the frame 30 is capable of rotating with respect to the flying machine body 20. Moreover, the pair of looped belts 33 are provided so as to form triangular shapes at both width direction end portions of the frame body 31. Accordingly, as illustrated in FIG. 5, even when a step is present on the target object, the flying machine 10 is capable of riding over the step by rotating the frame 30 so as to change the faces of the looped belts 33 that contact the target object. Movement following irregularities on the target object is thereby possible, thus enabling an improvement in drivability over irregularities.

Employing the linearly shaped pressing sections 35 increases the contact surface area between the target object and the flying machine 10, thereby enabling the flying machine 10 to be moved stably along the target object. This thereby enables imaging precision with respect to the target object to be even further improved.

Moreover, the looped belts 33 are each entrained around the plural pulleys 32 provided at the respective width direction end portion of the frame body 31. Accordingly, the looped belts 33 rotate when the flying machine 10 moves along the target object in a state in which the looped belts 33 are in contact with the target object, thereby enabling the flying machine 10 to be moved along the target object smoothly.

Moreover, one of the linearly shaped sides 34 formed by the respective looped belts 33 is employed as each of the pressing sections 35, increasing the contact surface area between the target object and the flying machine 10, and thereby enabling wind-resistance performance and straight line stability of the flying machine 10 to be improved.

Moreover, each of the plural pulleys 32 provided on the one width direction end portion of the frame body 31 and each of the plural pulleys 32 provided on the other width direction end portion of the frame body 31 are coupled together by the plural coupling rods 43. This thereby enables chattering of the plural pulleys 32 to be suppressed, thus enabling smooth rotation of the looped belts 33. This thereby enables an improvement in the driving performance of the flying machine 10.

Moreover, the plural side face support rods 42 respectively extending in directions orthogonal to the axial direction of the central support rod 41 are provided at the respective end portions of the central support rod 41 that supports the flying machine body 20. Moreover, the plural coupling rods 43 are respectively supported by the plural side face support rods 42 provided on both sides of the plural coupling rods 43. This thereby enables the rigidity of the frame body 31 including the central support rod 41, the plural side face support rods 42, and the plural coupling rods 43 to be improved. Accordingly, for example, it is possible to suppress shock damage to the frame body 31 on landing, and detachment of the looped belts 33 due to distortion of the frame body 31 when the flying machine 10 lands.

Moreover, the flying machine body 20 is disposed between the pair of looped belts 33 when the frame 30 is viewed face-on, and is disposed inside the looped belts 33 when the frame 30 is viewed from the side. The flying machine body 20 is thus enclosed by the frame 30 including the frame body 31 and the pair of looped belts 33. The flying machine body 20 can accordingly be protected by the frame 30, and the flying machine body 20 can be suppressed from coming into contact with external objects, obstacles, and the like. This thereby enables obstruction of the rotation of the rotor blades 23, and damage to the flying machine body 20, to be suppressed.

Moreover, the camera 50 is also disposed between the pair of looped belts 33 when the frame 30 is viewed face-on, and disposed inside the looped belts 33 when the frame 30 is viewed from the side. The camera 50 is also thus enclosed within the frame 30. The camera 50 can accordingly be protected by the frame 30, and the camera 50 can also be suppressed from coming into contact with external objects, obstacles, and the like. This thereby enables the angle of the camera 50 to be suppressed from changing due to the camera 50 being subjected to a shock, and enables damage to the camera 50 to be suppressed.

Next, explanation follows regarding a modified example of the first exemplary embodiment.

In the first exemplary embodiment described above, the target object on which the flying machine 10 performs operations is, for example, a structure such as a bridge or a building. However, the target object may be structure other than a bridge or a building, for example a tunnel, a roof, a ladder, a utility pole, a chimney, a large passenger aircraft, or another structure. Moreover, the target object may, for example, be a ground surface or water surface rather than a structure. Namely, the target object on which the flying machine 10 performs operations may be one or more out of a bridge, a building, a tunnel, a roof, a ladder, a utility pole, a chimney, a large passenger aircraft, another structure, a ground surface, or a water surface.

Moreover, in the first exemplary embodiment described above, the flying machine 10 images using the camera 50 as an example of an "operation". However, instead of imaging, for example, observing, recording, examining, inspecting, conveying, coating, marking, or another operation may be applied.

Moreover, in the first exemplary embodiment described above, the camera 50 that images is employed as an example of a "detector". However, detectors suited to other operations may also be employed.

Moreover, in the first exemplary embodiment described above, the flying machine body 20 is supported on the central support rod 41 through the attachment member 44, such that the flying machine body 20 is rotatable about the width direction of the frame body 31. However, the flying machine body 20 may be configured such that the flying machine body 20 is rotatable with respect to the attachment member 44 about the height direction of the frame body 31 as well as being rotatable about the width direction of the frame body 31.

Second Exemplary Embodiment

Next, explanation follows regarding a second exemplary embodiment of technology disclosed herein.

A flying machine 120 according to a second exemplary embodiment illustrated in FIG. 6 to FIG. 9 differs in structure in the following manner with respect to the flying machine 10 (see FIG. 1) of the first exemplary embodiment described above.

The flying machine 120 of the second exemplary embodiment includes a frame 70. The frame 70 includes three wheels 72 and a looped frame 73 on each side instead of the three pulleys 32 and the looped belts 33 (see FIG. 1) on each side in the first exemplary embodiment. Similarly to the frame body 31 of the first exemplary embodiment (see FIG. 1), a frame body 71 of the frame 70 includes the central support rod 41, plural of the side face support rods 42, and plural of the coupling rods 43.

Each looped frame 73 is an example of a "looped member". The looped frame 73 forms an equilateral triangular shape about the width direction of the frame body 71, as an example of a "polygonal shape". Each looped frame 73 has a thin plate shape. The respective corner portions of each looped frame 73 are connected to respective leading end portions of the side face support rods 42.

The three wheels 72 on each side are respectively provided at the leading end portions of the respective side face support rods 42, namely at the respective corners of the looped frame 73. The three wheels 72 on each side are rotatably fixed to respective end portions of the coupling rods 43 penetrating the respective corners of the looped frame 73.

Figure 7:
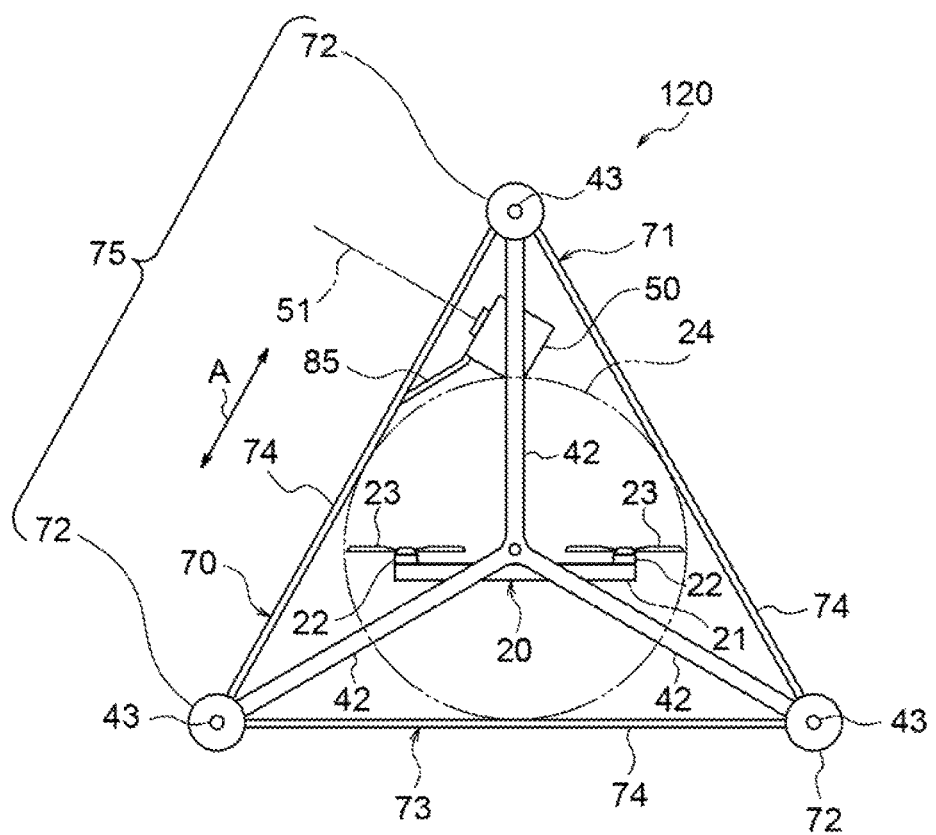
FIG. 7 is a side view of the flying machine in FIG. 6.
Figure 8:
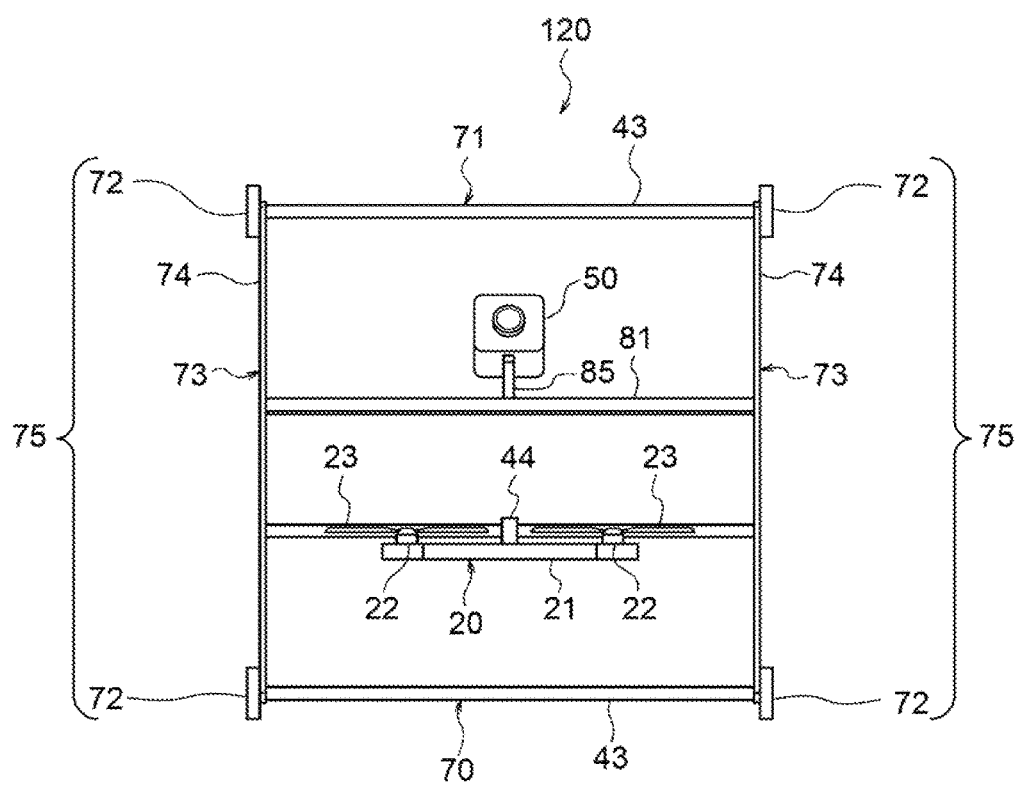
FIG. 8 is a front view of the flying machine in FIG. 6.
Figure 9:
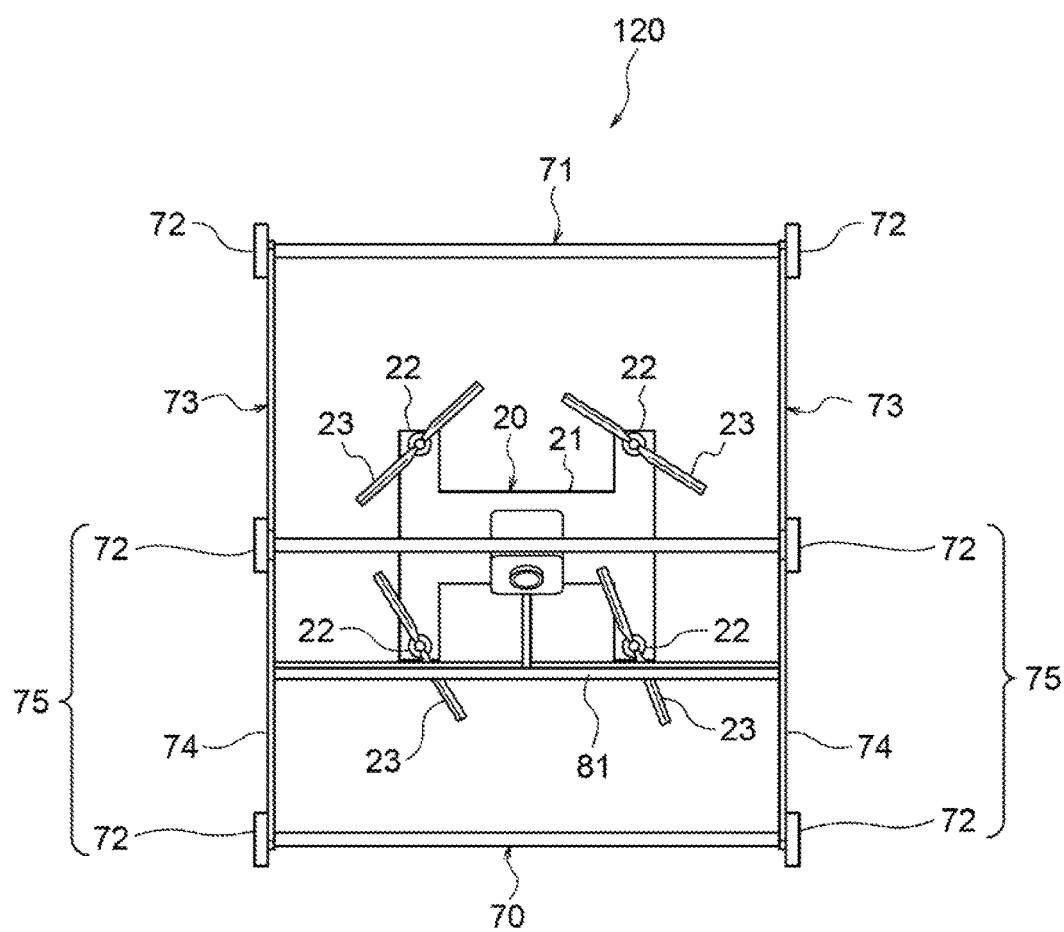
FIG. 9 is a plan view of the flying machine in FIG. 6.

As illustrated in FIG. 7, each of the looped frames 73 that form equilateral triangular shapes has a size such that the flying machine body 20 is wholly contained within a circle 24 inscribed within the looped frames 73 as viewed from the side of the frame 70. The flying machine body 20 is positioned inside the looped frames 73 of the frame 70 as viewed from the side.

The frame 70 including the pair of looped frames 73 described above, the central support rod 41, the plural side face support rods 42, and the plural coupling rods 43 is formed in a substantially tubular cage shape having an axial direction running along the width direction of the flying machine 120. Moreover, the flying machine body 20 is disposed between the pair of looped frames 73 when the frame 70 is viewed face-on, and is disposed inside the looped frames 73 when the frame 70 is viewed from the side. The flying machine body 20 is thus enclosed within the frame 70 including the frame body 71 and the pair of looped frames 73.

The looped frames 73 that form equilateral triangular shapes as described above each include three sides 74, and the frame body 71 includes a coupling-and-fixing rod 81 extending in the width direction of the frame body 71. The coupling-and-fixing rod 81 couples one of the sides 74 out of the three sides 74 on one side to one of the sides 74 out of the three sides 74 on the other side.

The camera 50 is fixed to the coupling-and-fixing rod 81, described above, of the frame 70 through a leg 85. The leg 85 is an example of a "fixing section". The camera 50 is disposed at the upper side of the coupling-and-fixing rod 81. Similarly to the flying machine body 20 described above, the camera 50 is disposed between the pair of looped frames 73 when the frame 70 is viewed face-on, and is disposed inside the looped frames 73 when the frame 70 is viewed from the side. The camera 50 is thereby also enclosed within the frame 70.

As illustrated in FIG. 7, as viewed from the side of the frame 70, the direction in which the camera 50 faces is set such that the optical axis 51 runs orthogonal to one side 74 out of three sides 74 formed by the looped frames 73. Out of the three sides 74 formed by the looped frames 73, the pairs of wheels 72 provided at both end portions of the side 74 orthogonal to the optical axis 51 of the camera 50 functions as a pressing section 75 that is pressed against a target object, as described later.

The pressing section 75 is pressed against the target object such that the pairs of wheels 72 contact the target object. The respective pressing sections 75 are formed by the looped frames 73 on each side, and are thus provided at both width direction end portions of the frame body 71. The one side 74 connecting each pair of wheels 72 functioning as the pressing section 75 extends along a direction orthogonal to the width direction of the frame body 71. The pair of wheels 72 functioning as the pressing section 75 are an example of "two locations where the pressing section contacts a target object", and are separated from each other along the direction (the arrow A direction) orthogonal to the width direction of the frame body 71.

Moreover, as described above, the direction in which the camera 50 faces is set such that the optical axis 51 of the camera 50 is orthogonal to the one side 74 as viewed from the side of the frame 70. The optical axis direction of the camera 50, namely the imaging direction of the camera 50, is therefore set in the direction in which the pressing section 75 is pressed against the target object. Specifically, the imaging direction of the camera 50 is set as a direction orthogonal to a direction joining together the pair of wheels 72 functioning as the pressing section 75 (the one side 74 length direction), and facing toward the target object. The imaging direction of the camera 50 is an example of a "detection direction of the detector".

Next, explanation follows regarding an example of a method for using the flying machine 120 described above.

FIG. 10 illustrates an example of a method for using the flying machine 120. A target object 60 illustrated in FIG. 10 is a structure such as a bridge or a building. The target object 60 includes a vertical face 65.

In the present example, first, as illustrated by state (1), the flying machine 120 flies and the pairs of wheels 72, serving as the pressing sections 75, provided at both length direction end portions of the one side 74 of the respective looped frames 73 press against the vertical face 65 of the target object 60.

Then, as illustrated by state (2), the flying machine 120 ascends the vertical face 65 accompanying rotation of the pairs of wheels 72 functioning as the pressing sections 75.

Moreover, as described above, the direction in which the camera 50 faces is set such that the optical axis 51 runs orthogonal to the one side 74 connecting together the pair of wheels 72 that function as the pressing sections 75. The camera 50 then images the vertical face 65 with the direction in which the pressing sections 75 are pressed against the vertical face 65 as the imaging direction.

Note that as illustrated by state (2), in order to press the pressing sections 75 against the vertical face 65, the flying machine body 20 adopts a tilted state such that thrust toward the side of the vertical face 65 acts on the flying machine 120.

However, in the present exemplary embodiment, the camera 50 is fixed to the frame 70, and moreover, the camera 50 is fixed to the frame 70 with the direction in which the pressing sections 75 are pressed against the vertical face 65 as the imaging direction. Accordingly, the camera 50 is maintained in a state facing the vertical face 65 straight on, even when the flying machine body 20 is tilted.

In the present example, the flying machine 120 moves along a flat vertical face 65. However, the flying machine 120 according to the second exemplary embodiment may obviously move so as to follow irregularities, as in the example given in the first exemplary embodiment described above.

Next, explanation follows regarding operation and advantageous effects of the second exemplary embodiment.

In the flying machine 120 according to the second exemplary embodiment, the camera 50 is fixed to the frame 70, and moreover, the camera 50 is fixed to the frame 70 with the direction in which the pressing sections 75 are pressed against the target object as the imaging direction. Accordingly, as illustrated by state (2) in FIG. 10, the camera 50 can be maintained in a state facing the target object straight on in a state in which the pressing sections 75 are pressed against the target object, even when the flying machine body 20 is tilted. This thereby enables the imaging precision with respect to the target object to be improved.

Moreover, in the flying machine 120 according to the second exemplary embodiment, the frame 70 is capable of rotating with respect to the flying machine body 20, and moreover, the pair of looped frames 73 that form triangular shapes are provided at the respective width direction end portions of the frame body 71. Accordingly, similarly to in the first exemplary embodiment, even when a step is present on the target object, the flying machine 120 is capable of riding over the step by rotating the frame 70 so as to change the face of the looped frames 73 contacting the target object. Movement so as to follow irregularities on the target object is thereby possible, thus enabling an improvement in drivability over irregularities.

Due to causing each pair of wheels 72 provided at both length direction end portions of the one side 74 to function as the pressing section 75, the flying machine 120 is pressed stably against the target object, enabling the flying machine 120 to be moved stably along the target object. This thereby enables imaging precision with respect to the target object to be even further improved.

Moreover, when the flying machine 120 moves along the target object in a state in which the pairs of wheels 72 functioning as the pressing sections 75 are in contact with the target object, the pair of wheels 72 rotate, enabling the flying machine 120 to be moved along the target object smoothly.

The plural wheels 72 provided on one width direction end portion of the frame body 71 and the plural wheels 72 provided on the other width direction end portion of the frame body 71 are respectively coupled together by the plural coupling rods 43. This thereby enables chattering of the plural wheels 72 to be suppressed, thus enabling smooth rotation of the plural wheels 72. This thereby enables an improvement in the driving performance of the flying machine 120.

Moreover, the flying machine body 20 is disposed between the pair of looped frames 73 when the frame 70 is viewed face-on, and is disposed inside the looped frames 73 when the frame 70 is viewed from the side. The flying machine body 20 is thus enclosed by the frame 70 including the frame body 71 and the pair of looped frames 73. The flying machine body 20 can accordingly be protected by the frame 70, and the flying machine body 20 can be suppressed from coming into contact with external objects, obstacles, and the like. This thereby enables obstruction of the rotation of the rotor blades, and damage to the flying machine body 20, to be suppressed.

Moreover, the camera 50 is also disposed between the pair of looped frames 73 when the frame 70 is viewed face-on, and is disposed inside the looped frames 73 when the frame 70 is viewed from the side. The camera 50 is also thus enclosed within the frame 70. The camera 50 can accordingly be protected by the frame 70, and the camera 50 can also be suppressed from coming into contact with external objects, obstacles, and the like. This thereby enables the angle of the camera 50 to be suppressed from changing due to the camera 50 being subjected to a shock, and enables damage to the camera 50 to be suppressed.

Note that in the second exemplary embodiment described above, configurations similar to those of the first exemplary embodiment are capable of exhibiting similar operation and advantageous effects to those of the first exemplary embodiment. Moreover, the second exemplary embodiment may be applied with a modified example similar to that of the first exemplary embodiment.

Third Exemplary Embodiment

Next, explanation follows regarding a third exemplary embodiment of technology disclosed herein.

Figure 11:
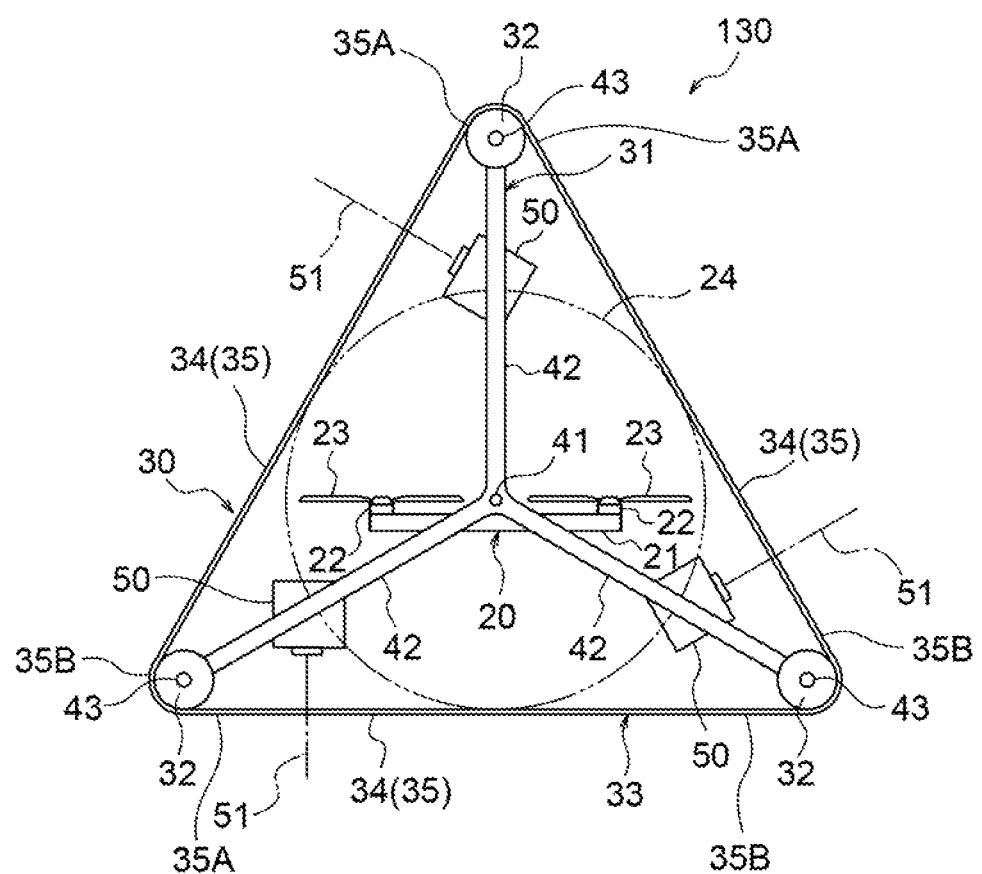
FIG. 11 is a side view of a flying machine according to a third exemplary embodiment.

A flying machine 130 according to a third exemplary embodiment illustrated in FIG. 11 differs in structure in the following manner with respect to the flying machine 10 (see FIG. 1) of the first exemplary embodiment described above.

Namely, each of the plural sides 34 of the respective looped belts 33 functions as a pressing section 35, and plural cameras 50 are fixed to the frame body 31 corresponding to the plural pressing sections 35. The direction in which each camera 50 faces is set such the optical axis 51 runs orthogonal to the corresponding pressing section 35 (corresponding side 34). Accordingly, the optical axis directions of the cameras 50, namely the imaging directions of the cameras 50, are set in the directions in which the respective pressing sections 35 are pressed against the target object.

The plural cameras 50 are fixed to the frame 30 at suitable locations. Each of the plural cameras 50 is disposed between the pair of looped belts 33, and disposed inside the looped belts 33 when the frame 30 is viewed from the side. The plural cameras 50 are thus enclosed by the frame 30 including the frame body 31 and the pair of looped belts 33.

Next, explanation follows regarding operation and advantageous effects of the third exemplary embodiment.

Figure 12:
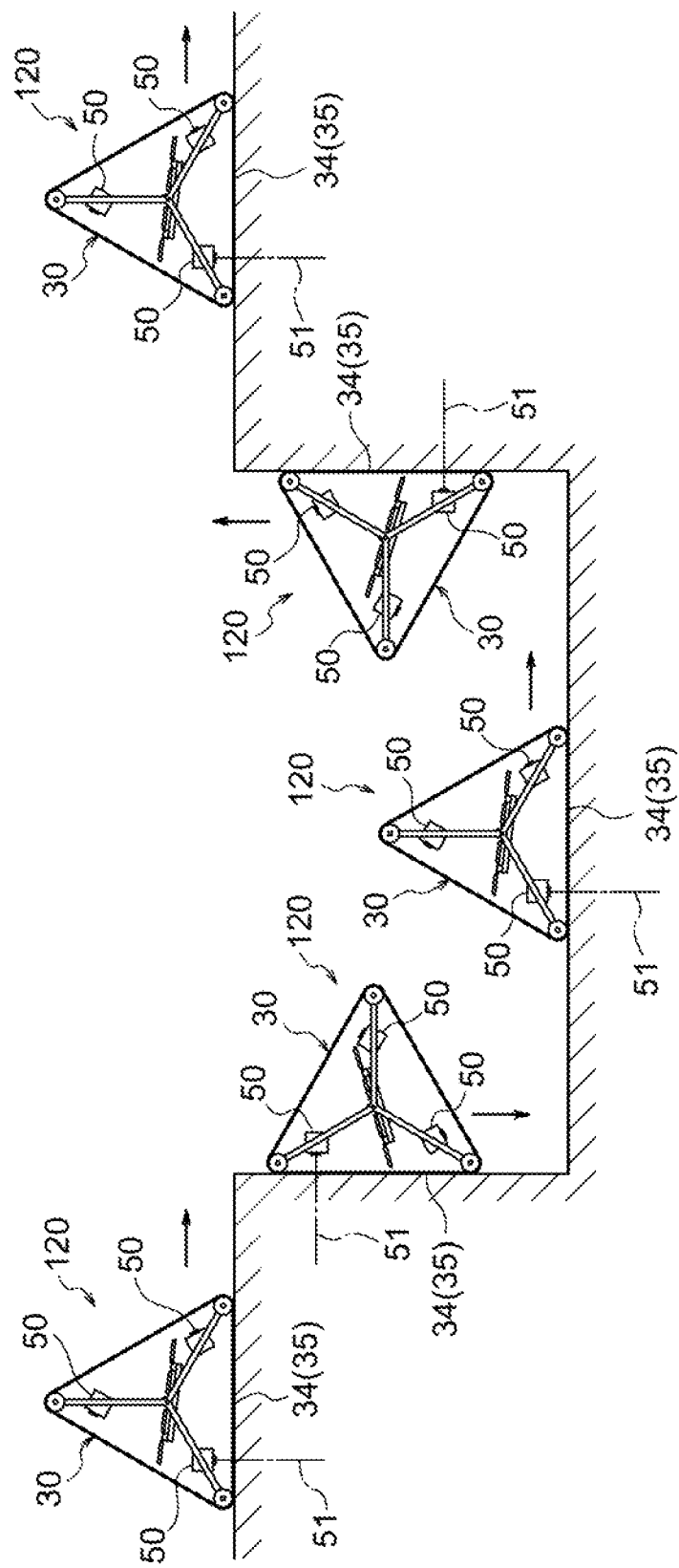
FIG. 12 is a diagram illustrating an example of a method for using a flying machine of the third exemplary embodiment.

In the flying machine 130 of the third exemplary embodiment, each of the plural sides 34 of the looped belts 33 configures a pressing section 35, and the plural cameras 50 are fixed to the frame body 31 so as to correspond to the plural pressing sections 35. Accordingly, for example, as illustrated in FIG. 12, when the flying machine 130 moves so as to follow an irregularity on the target object, one of the plural cameras 50 is still able to image a respective wall face of the irregularity even when the frame 30 rotates. This thereby enables the imaging range on a target object having an irregularity to be enlarged.

In the third exemplary embodiment described above, configurations similar to those of the first exemplary embodiment are capable of exhibiting similar operation and advantageous effects to those of the first exemplary embodiment. Moreover, the third exemplary embodiment may be applied with a modified example similar to that of the first exemplary embodiment. Furthermore, the third exemplary embodiment described above may be combined with the first exemplary embodiment, or combined with the second exemplary embodiment.

Fourth Exemplary Embodiment

Next, explanation follows regarding a fourth exemplary embodiment of technology disclosed herein.

A flying machine 140 according to the fourth exemplary embodiment illustrated in FIG. 13 differs in structure in the following manner with respect to the flying machine 10 (see FIG. 1) of the first exemplary embodiment described above.

Namely, in the flying machine 140 according to the fourth exemplary embodiment, there are, for example, four of the side face support rods 42 provided on each side of the central support rod 41. Moreover, four of the plural coupling rods 43 are provided, and four of the plural pulleys 32 are provided corresponding to the four side face support rods 42 on each respective side of the coupling rods 43. Moreover, the four pulleys 32 on each side are disposed at uniform intervals about the width direction of the frame body 31, such that the looped belts 33 form square shapes about the width direction of the frame body 31, as an example of a "polygonal shape".

The square shaped looped belts 33 each have a size such that the flying machine body 20 is wholly contained within a circle 24 inscribed within the looped belts 33 as viewed from the side of the frame 30. The flying machine body 20 is positioned inside the looped belts 33 of the frame 30 as viewed from the side.

The frame 30 that includes the pair of looped belts 33 described above, the central support rod 41 described above, the plural side face support rods 42, and the plural coupling rods 43 is formed in a substantially tubular cage shape having an axial direction running along the width direction of the flying machine 140. The flying machine body 20 is disposed between the pair of looped belts 33 when the frame 30 is viewed face-on, and is disposed inside the looped belts 33 when the frame 30 is viewed from the side. The flying machine body 20 is thus enclosed within the frame 30 including the frame body 31 and the pair of looped belts 33.

The camera 50 is fixed to the central support rod 41 of the frame 30 through the legs 45. The camera 50 is disposed at the upper side of the central support rod 41. Moreover, similarly to the flying machine body 20 described above, the camera 50 is disposed between the pair of looped belts 33 when the frame 30 is viewed face-on, and is disposed inside the looped belts 33 when the frame 30 is viewed from the side. The camera 50 is thus also enclosed within the frame 30.

As viewed from the side of the frame 30, the direction in which the camera 50 faces is set such that the optical axis 51 runs orthogonal to one side 34 out of the four sides 34 formed by the looped belts 33. Out of four sides 34 formed by each of the looped belts 33, the side 34 to which the optical axis 51 of the camera 50 is orthogonal functions as the pressing section 35 that is pressed against the target object. The pressing section 35 is formed by one side 34, and is therefore linear in shape.

As described above, the direction in which the camera 50 faces is set such that the optical axis 51 of the camera 50 runs orthogonal to the pressing sections 35. Accordingly, the optical axis direction of the camera 50, namely the imaging direction of the camera 50, is set in the direction in which the pressing sections 35 are pressed against the target object.

Next, explanation follows regarding operation and advantageous effects of the fourth exemplary embodiment.

Figure 13:
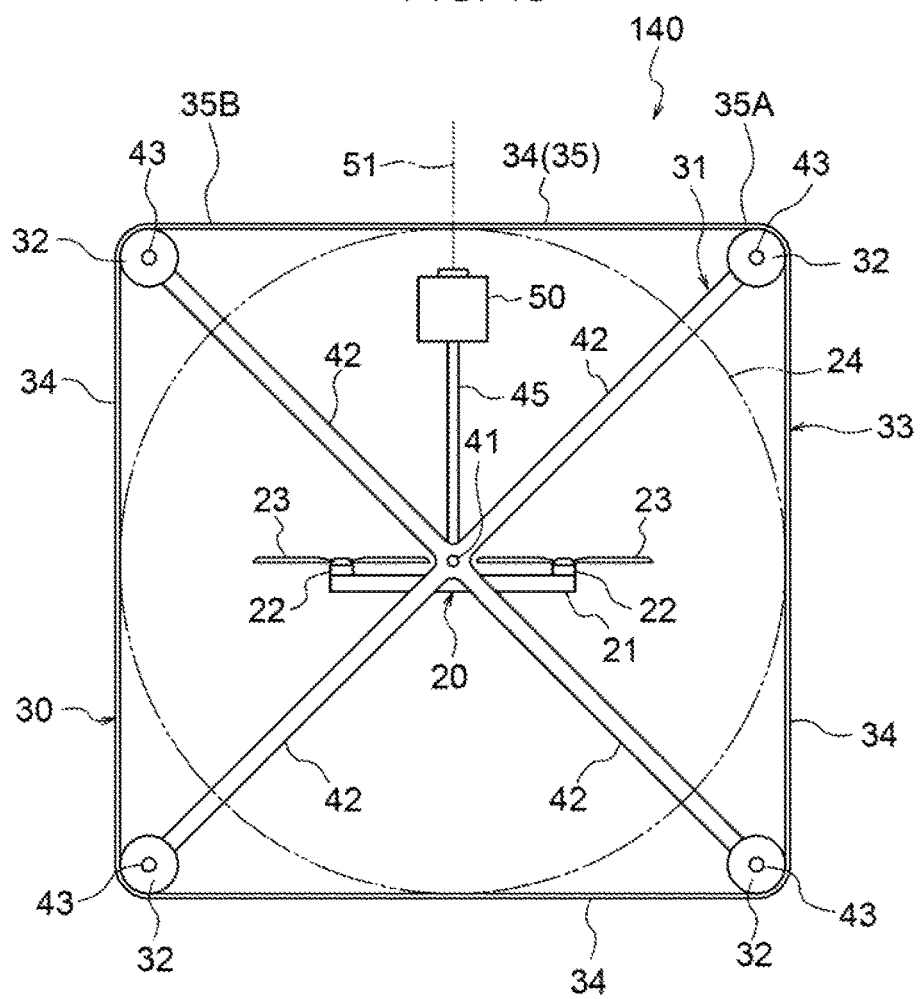
FIG. 13 is a side view of a flying machine according to a fourth exemplary embodiment.

In the flying machine 140 of the fourth exemplary embodiment illustrated in FIG. 13, the looped belts 33 form square shapes with the four sides 34. Accordingly, for example, the rotation angle when the frame 30 rotates so as to follow an irregularity on the target object can be reduced in comparison to when the looped belts 33 form equilateral triangular shapes. The movement of the flying machine 140 so as to follow an irregularity on the target object can accordingly be made smoother, enabling a further improvement in the drivability of the flying machine 140 over irregularities.

Note that in the fourth exemplary embodiment described above, configurations similar to those of the first exemplary embodiment are capable of exhibiting similar operation and advantageous effects to those of the first exemplary embodiment.

Next, explanation follows regarding a modified example of the fourth exemplary embodiment.

Figure 14:
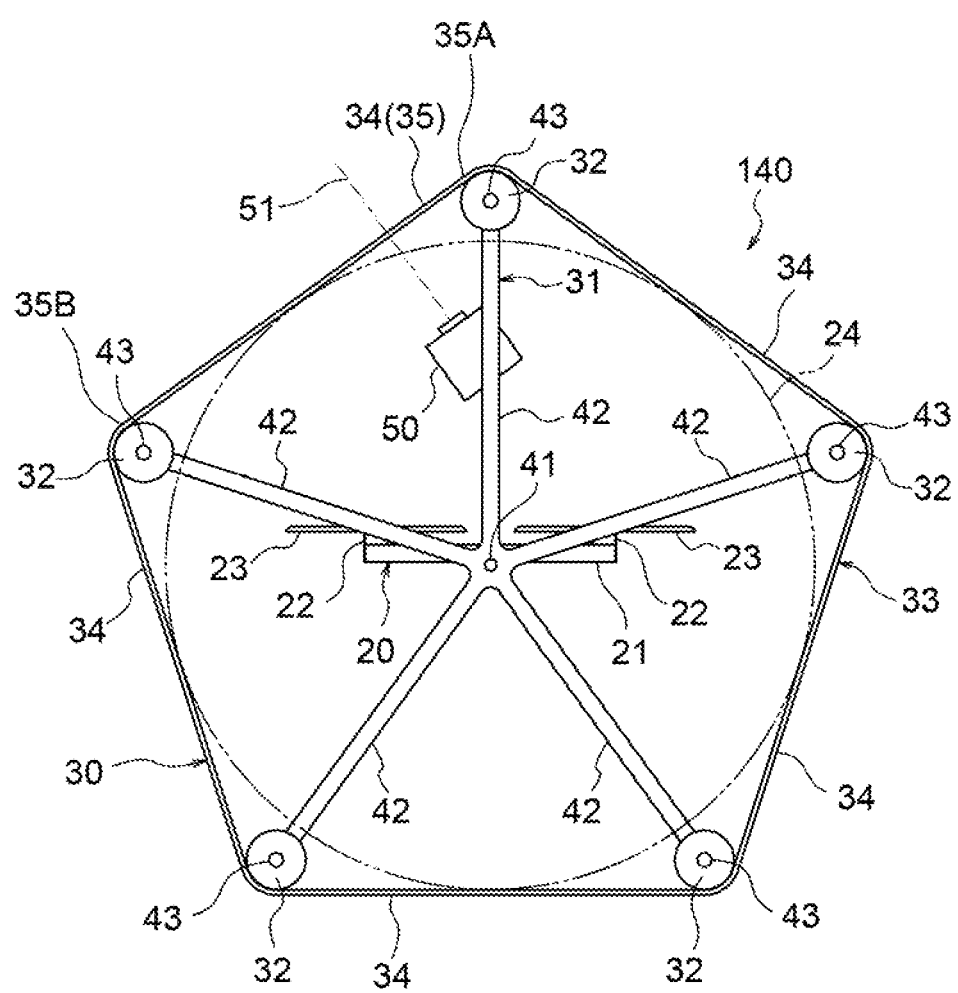
FIG. 14 a side view illustrating a modified example of a flying machine according to the fourth exemplary embodiment.

In the fourth exemplary embodiment described above, the looped belts 33 are, as an example, configured in square shapes with the four sides 34. However, as illustrated in FIG. 14, the looped belts 33 may, for example, be configured in regular pentagonal shapes having five sides 34. Namely, the looped belts 33 may be configured in polygonal shapes having four or more sides 34.

Note that a modified example similar to that of the first exemplary embodiment may also be adopted in the fourth exemplary embodiment. Moreover, by combining the second exemplary embodiment described above with the fourth exemplary embodiment, the flying machine 140 may be provided with polygonal shaped looped frames 73 (see FIG. 6) with four or more sides 74 in place of the looped belts 33.

Moreover, by combining the flying machine 140 of the fourth exemplary embodiment with the third exemplary embodiment described above, plural of the cameras 50 may be fixed to the frame body 31 corresponding to the plural pressing sections 35.

Fifth Exemplary Embodiment

Next, explanation follows regarding a fifth exemplary embodiment of technology disclosed herein.

A flying machine 150 according to the fifth exemplary embodiment illustrated in FIG. 15 differs in structure in the following manner with respect to the flying machine 120 (see FIG. 6) of the second exemplary embodiment described above.

Namely, in the flying machine 150 according to the fifth exemplary embodiment, the looped frames 73 are also provided with plural of the wheels 72 on the sides 74 between the plural corners, in addition to the wheels 72 provided on each of the corners. Moreover, on one side 74 out of the plural sides 74 formed by the looped frames 73, plural of the wheels 72 are arranged along the length direction of the one side 74. These plural wheels 72 function as the pressing section 75. The pressing sections 75 are pressed against the target object such that the plural wheels 72 contact the target object. The plural wheels 72 are an example of "plural locations of the pressing section that contact the target object", and are separated from each other along a direction (the arrow A direction) orthogonal to the width direction of the frame body 71.

Next, explanation follows regarding operation and advantageous effects of the fifth exemplary embodiment.

Figure 15:
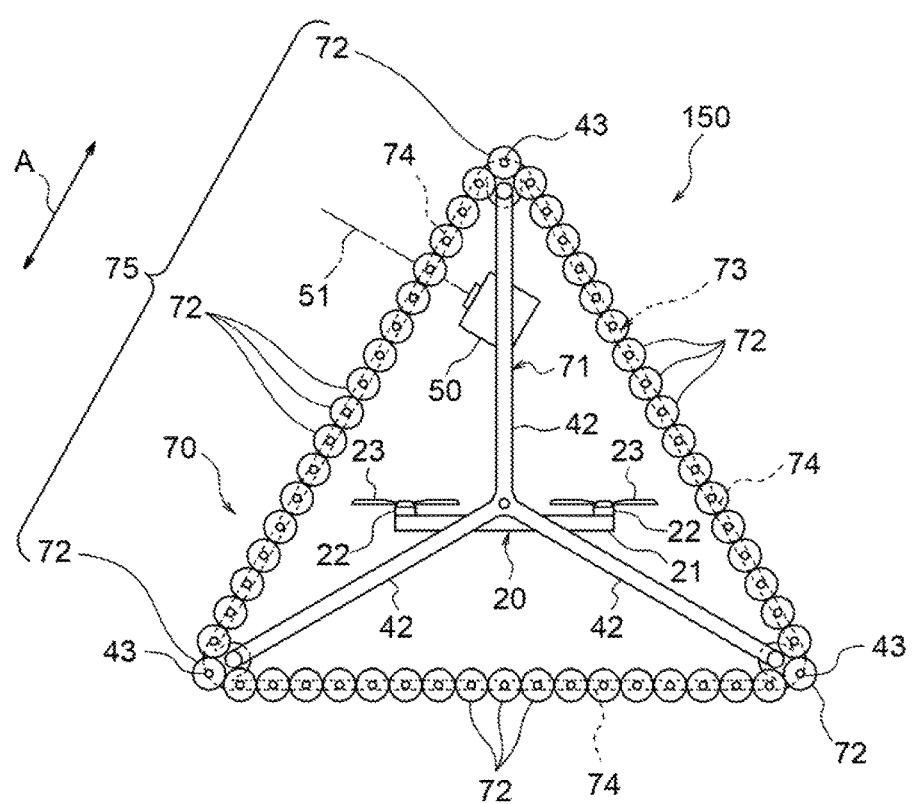
FIG. 15 is a side view of a flying machine according to a fifth exemplary embodiment.

In the flying machine 150 according to the fifth exemplary embodiment illustrated in FIG. 15, the pressing sections 75 each include plural of the wheels 72, arranged along the length direction of the one side 74. Accordingly, when the flying machine 150 is moving along the target object in a state in which the plural wheels 72 are in contact with the target object, the plural wheels 72 rotate, enabling the flying machine 150 to be moved along the target object smoothly.

Note that in the fifth exemplary embodiment described above, configurations similar to those of the second exemplary embodiment are capable of exhibiting similar operation and advantageous effects to those of the second exemplary embodiment. Moreover, the fifth exemplary embodiment may be applied with a modified example similar to that of the first exemplary embodiment.

Sixth Exemplary Embodiment

Next, explanation follows regarding a sixth exemplary embodiment of technology disclosed herein.

A flying machine 160) according to the sixth exemplary embodiment illustrated in FIG. 16 and FIG. 17 differs in structure in the following manner with respect to the flying machine 10 (see FIG. 1) according to the first exemplary embodiment described above.

Namely, the flying machine 160 according to the sixth exemplary embodiment includes a flying machine body 20, a frame 90, and a camera 50.

The flying machine body 20 is a multicopter, similarly to in the first exemplary embodiment, and includes a base 21, plural motors 22, and plural rotor blades 23. In the present exemplary embodiment, as an example, there are four each of the plural motors 22 and the plural rotor blades 23.

The frame 90 includes a frame body 91, a pair of wheels 92, a pair of arms 93, and a coupling rod 94. The frame body 91 is, as an example, applied with an axle shaft extending in the width direction of the flying machine body 20. The flying machine body 20 is fixed at a central portion in the width direction, this being the axial direction of the frame body 91. The pair of wheels 92 are provided at both width direction end portions of the frame body 91, and are supported by the frame body 91 so as to be capable of rotating.

The pair of arms 93 are respectively disposed between the pair of wheels 92 and the flying machine body 20. The pair of arms 93 are supported by the frame body 91, and swing about the width direction of the frame body 91. A length direction central portion of each arm 93 is supported by the frame body 91 so as to be capable of swinging.

Each arm 93 is formed as a first arm portion 95 on one side of the swing center, and each arm 93 is formed as a second arm portion 96 on the other side of the swing center. The length dimensions of the first arm portion 95 and the second arm portion 96 are each set longer than the dimension of radius of the wheels 92. Accordingly, a leading end side 95A of the first arm portion 95 and a leading end side 96A of the second arm portion 96 each project out past the wheels 92 to a radial direction outside of the wheels 92.

The leading end side 95A of the first arm portion 95 and the leading end side 96A of the second arm portion 96 are each bent at obtuse angles. As viewed from the side of the frame 90, the leading end side 95A of the first arm portion 95 extends along a direction orthogonal to an extension direction of the leading end side 96A of the second arm portion 96.

A torsion spring 100 is provided at the swing center of each arm 93, and is disposed with its axial direction in the width direction of the frame body 91. One end of the torsion spring 100 is fixed to the frame body 91, and the other end of the torsion spring 100 is fixed to the arm 93.

The torsion spring 100 is an example of a "swing angle defining structure". Namely, a swing angle of the arm 93 is defined by the torsion spring 100 such that an idle wheel 97 is positioned further forward (toward the side of the target object) than the wheels 92 in a state in which the idle wheel 97 is not in contact with the target object.

Moreover, the torsion spring 100 is also an example of a "swinging force application structure". Namely, the arm 93 is applied with a swinging force in a direction about the swing center (arrow R direction) by the torsion spring 100 so as to press the idle wheel 97 against the target object.

The coupling rod 94 extends in the width direction of the frame body 91, and couples together leading end portions of the second arm portions 96 formed to the pair of arms 93. The respective idle wheels 97 are provided at leading end portion of each of the first arm portions 95, and the camera 50 is fixed to a length direction central portion of the coupling rod 94. The coupling rod 94 to which the camera 50 is fixed is an example of a "fixing section".

In a state in which the idle wheels 97 are not in contact with the target object, the idle wheels 97 are disposed at a front lower side of the wheels 92, and the camera 50 is disposed at a rear upper side of the wheels 92. The direction in which the camera 50 faces is set such that the optical axis 51 of the camera 50 is orthogonal to a tangent line 101 tangential to the wheel 92 and the idle wheel 97 as viewed from the side of the frame 90.

The wheels 92 and the idle wheels 97 provided at the leading end portions of the first arm portions 95 function as pressing sections 105 that are pressed against the target object, as described below. Each the pressing section 105 is pressed against the target object such that the wheel 92 and the idle wheel 97 contact the target object. The respective pressing sections 105 are formed by the pair of wheels 92 on both sides and the idle wheels 97, and are thus provided at both width direction end portions of the frame body 91. The idle wheel 97 provided to the leading end portion of each first arm portion 95 is an example of a "leading end portion of the arm".

Next, explanation follows regarding an example of a method for using the flying machine 160 described above.

Figure 18:
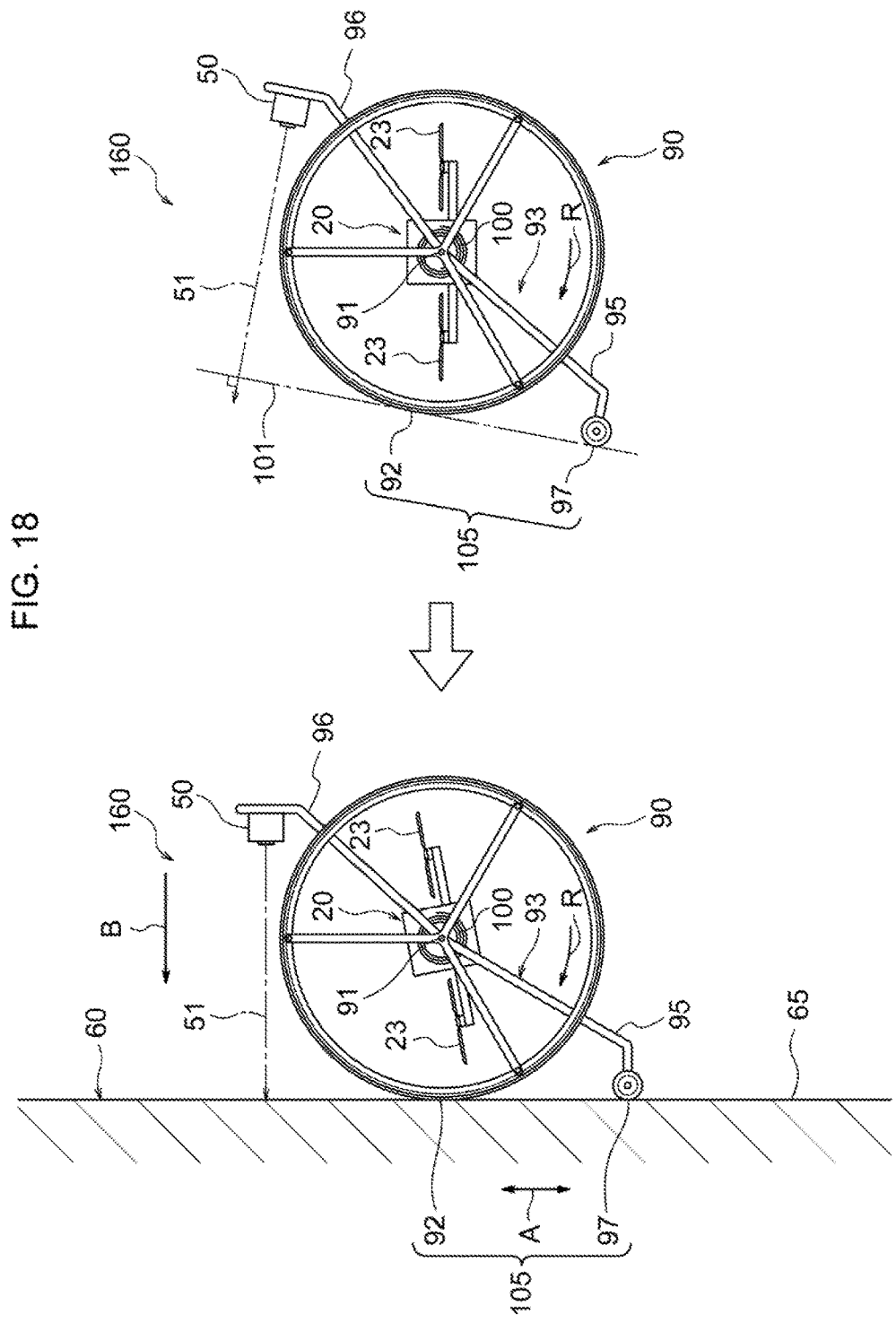
FIG. 18 is a diagram illustrating an example of a method for using a flying machine of the sixth exemplary embodiment.

FIG. 18 illustrates an example of a method for using the flying machine 160. The target object 60 illustrated in FIG. 18 is a structure such as a bridge or a building. The target object 60 has a vertical face 65.

When the flying machine 160 is flying, the idle wheels 97 are disposed further forward than the wheels 92. Accordingly, when the flying machine 160 flies toward the vertical face 65, the idle wheels 97 contact the vertical face 65 first. Moreover, when the flying machine 160 moves further toward the vertical face 65 side, the arm 93 swings in the opposite direction to the arrow R direction against the resilient force of the torsion spring 100 until the wheels 92 contact the vertical face 65. The wheels 92 and the idle wheels 97 then adopt a state pressed against the vertical face 65.

Contact portions between the respective wheels 92 and idle wheels 97 and the vertical face 65 are an example of "two locations of the pressing section that contact the target object", and are separated from each other along a direction (arrow A direction) orthogonal to the width direction of the frame body 91.

Moreover, as described above, the direction in which the camera 50 faces is set such that as viewed from the side of the frame 90, the optical axis 51 of the camera 50 is orthogonal to the tangent line 101 tangential to the wheel 92 and the idle wheel 97. Accordingly, in a state in which the wheels 92 and the idle wheels 97 (the pressing sections 105) are pressed against the vertical face 65, the imaging direction of the camera 50 is a direction (arrow B direction) that faces toward the target object and is orthogonal to a direction joining two locations where the wheel 92 and the idle wheel 97 contact the vertical face 65. The imaging direction of the camera 50 is an example of a "detection direction of the detector".

The flying machine 160 then, for example, ascends the vertical face 65, accompanying which the wheels 92 and the idle wheels 97 rotate, in a state in which the wheels 92 and the idle wheels 97 are pressed against the vertical face 65 of the target object 60. Moreover, the camera 50 images the vertical face 65 with the direction in which the wheels 92 and the idle wheels 97 are pressed against the vertical face 65 as the imaging direction.

Note that in order to press the wheels 92 and the idle wheels 97 against the vertical face 65, the flying machine body 20 adopts a tilted state such that thrust toward the side of the vertical face 65 acts on the flying machine 160.

However, in the present exemplary embodiment, the camera 50 is fixed to the arms 93. Moreover, in a state in which the wheels 92 and the idle wheels 97 (the pressing sections 105) are pressed against the vertical face 65, the imaging direction of the camera 50 is the direction (arrow B direction) that faces toward the vertical face 65 side and is orthogonal to the direction joining the two locations where the wheel 92 and the idle wheel 97 contact the vertical face 65. The camera 50 is thereby maintained in a state facing the vertical face 65 straight on even when the flying machine body 20 is tilted.

Next, explanation follows regarding operation and advantageous effects of the sixth exemplary embodiment.

As described in detail above, in the flying machine 160 of the sixth exemplary embodiment, the camera 50 is fixed to the arms 93. Moreover, in a state in which the wheels 92 and the idle wheels 97 (pressing sections 105) are pressed against the target object, the imaging direction of the camera 50 is the direction (arrow B direction) facing toward the target object and orthogonal to the direction joining the two locations where the wheel 92 and the idle wheel 97 contact the target object. Accordingly, as illustrated in FIG. 18, the camera 50 can be maintained in a state facing the target object straight on in a state in which the wheels 92 and the idle wheels 97 are pressed against the target object, even when the flying machine body 20 is tilted. This thereby enables the imaging precision with respect to the target object to be improved.

Moreover, in the flying machine 160 according to the sixth exemplary embodiment, in a state in which the idle wheels 97 are not in contact with the target object, the swing angle of each arm 93 is defined by the torsion spring 100, and the idle wheels 97 are positioned further forward than the wheels 92. This thereby enables the idle wheels 97 to be made to contact the target object reliably when the flying machine 160 moves forward toward the target object. The arms 93 can thereby be swung in the opposite direction to the arrow R direction until the wheels 92 contact the target object, thereby enabling the camera 50 to be made to face the target object reliably.

Moreover, in a state in which the wheels 92 and the idle wheels 97 (pressing sections 105) are pressed against the target object, the arms 93 are applied with a swinging force in the direction about the swing center (arrow R direction) by the torsion spring 100. This thereby enables the idle wheels 97 to be pressed stably against the target object, thus enabling the camera 50 to be made to face the target object reliably.

Moreover, the wheels 92 and the idle wheels 97 rotate when the flying machine 160 moves along the target object in a state in which the wheels 92 and the idle wheels 97 functioning as the pressing sections 105 are in contact with the target object. This thereby enables the flying machine 160 to be moved along the target object smoothly.

Next, explanation follows regarding a modified example of the sixth exemplary embodiment.

First Modified Example

Figure 19:
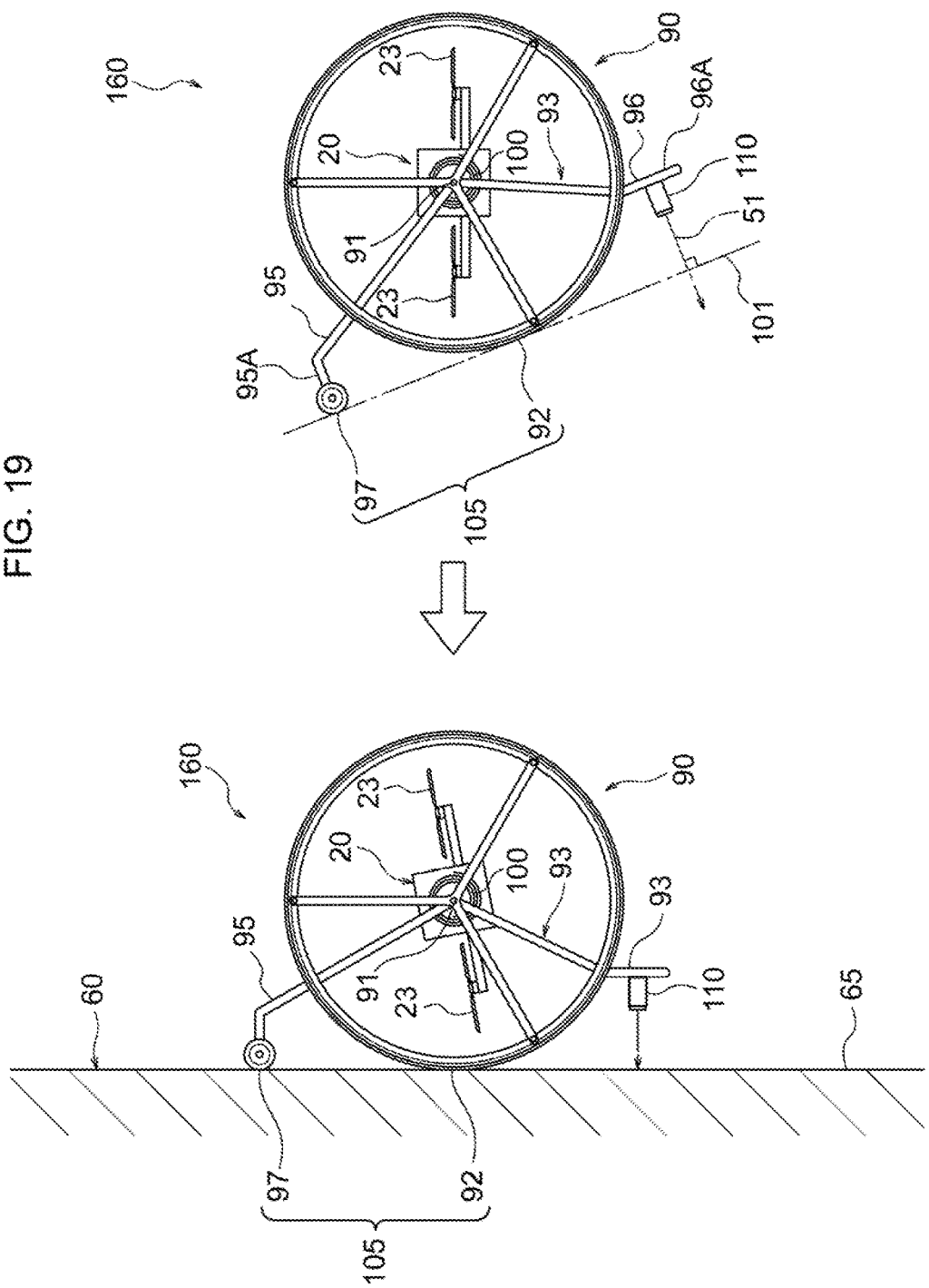
FIG. 19 is a diagram illustrating a first modified example of a flying machine according to the sixth exemplary embodiment.

In a first modified example illustrated in FIG. 19, the leading end sides 95A of the respective first arm portions 95 are positioned at a front upper side of the wheels 92. The idle wheels 97 are also disposed at the front upper side of the wheels 92. Instead of the camera 50 (see FIG. 16), a laser distance sensor 110 is employed. Moreover, the leading end sides 96A of the respective second arm portions 96 are positioned at a lower side of the wheels 92, such that the laser distance sensor 110 is disposed at a lower side of the wheels 92.

In such a configuration, when the flying machine 160 has moved toward the vertical face 65 side in a state in which the idle wheels 97 are in contact with the vertical face 65, the arms 93 swing until the wheels 92 contact the vertical face 65. This thereby enables the laser distance sensor 110 to be made to face the vertical face 65 straight on.

Second Modified Example

Figure 20:
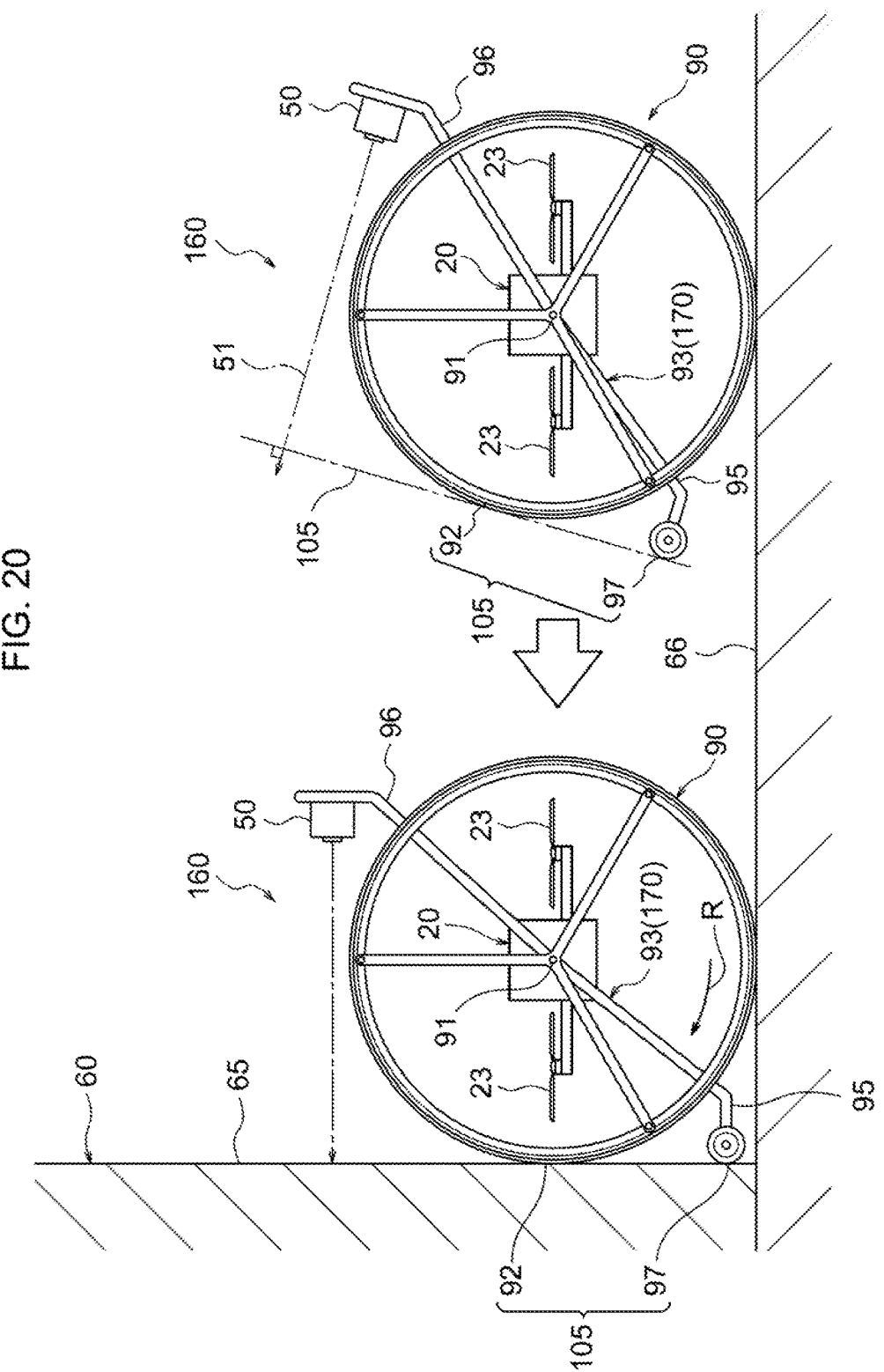
FIG. 20 is a diagram illustrating a second modified example of a flying machine according to the sixth exemplary embodiment.

In a second modified example illustrated in FIG. 20, a weight balance structure 170 is applied to the arms 93 instead of using the torsion springs 100 (see FIG. 16) to define the swing angle of the arm 93. Namely, a weight balance between the first arm portions 95 and idle wheels 97 and the second arm portions 96 and camera 50 is adjusted by the weight balance structure 170. Moments acting on the first arm portions 95 and the second arm portions 96 cancel each other out, thereby defining the swing angle of the arms 93 such that the idle wheels 97 are disposed forward of the wheels 92.

By defining the swing angle of the arms 93 in this manner to dispose the idle wheels 97 forward of the wheels 92, as illustrated in FIG. 20, for example, in cases in which the flying machine 160 moves along a horizontal face 66, the idle wheels 97 can be suppressed from getting in the way of the horizontal face 66.

Moreover, as illustrated in FIG. 20, when the idle wheels 97 make contact with the vertical face 65, the arms 93 swing accompanying the contact of the idle wheels 97 against the vertical face 65. In a state in which the wheels 92 and the idle wheels 97 are pressed against the vertical face 65, a moment acts on the arms 93 as a result of the weight balance structure 170. Accordingly, a swinging force in the arrow R direction is applied to the arms 93, thereby maintaining the state in which the idle wheels 97 are pressed against the vertical face 65. The weight balance structure 170 is an example of a "swing angle defining structure" and a "swinging force application structure".

Figure 16:
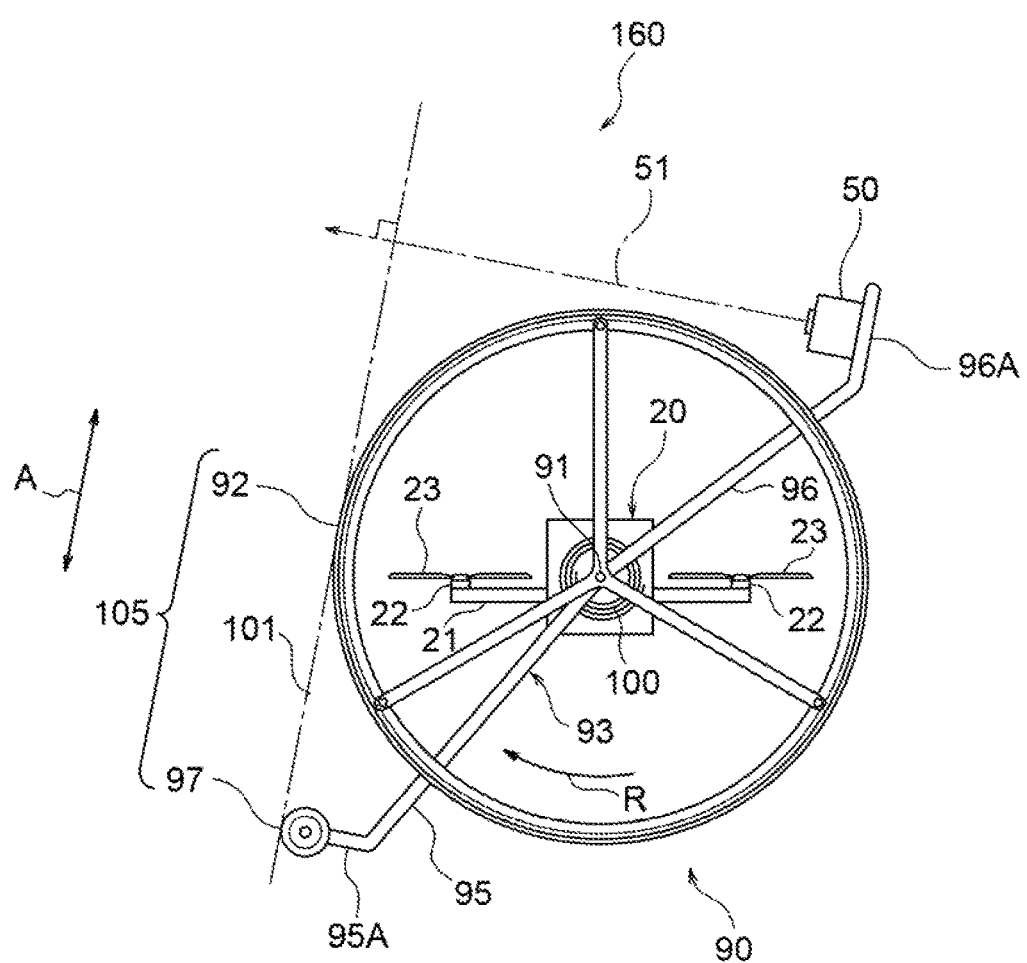
FIG. 16 is a side view of a flying machine according to a sixth exemplary embodiment.
Figure 17:
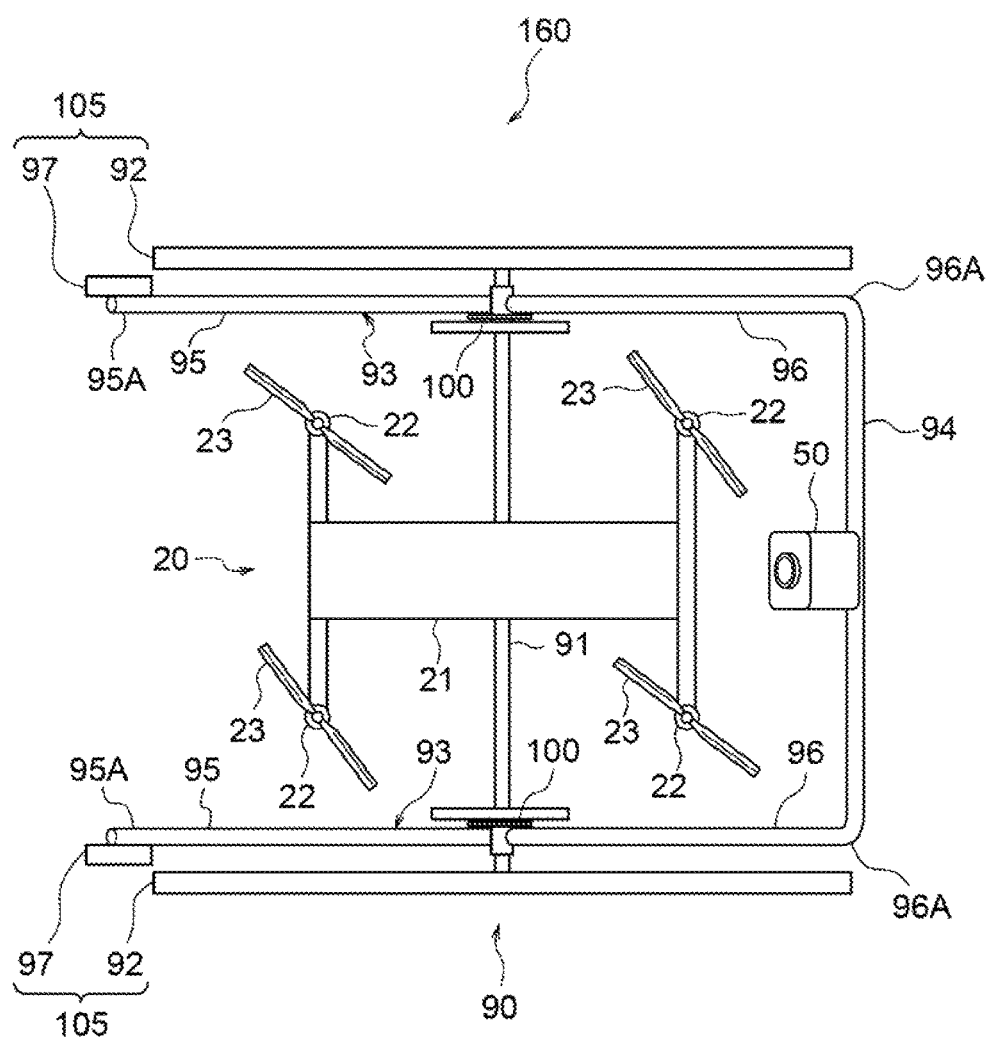
FIG. 17 is a plan view of the flying machine in FIG. 16.

Applying such a weight balance structure 170 enables the swing angle of the arms 93 to be defined, and enables a swinging force to be applied to the arms 93, without employing the torsion springs 100 (see FIG. 16). This thereby enables a reduction in the number of components, thus enabling a reduction in weight and reduction in costs of the flying machine 160.

Third Modified Example

In a third modified example illustrated in FIG. 21, a projecting stopper 180 is provided to the flying machine body 20. The stopper 180 gets in the way of the arm 93, thereby restricting swinging of the arm 93 toward the arrow R direction. In this state, the swing angle of the arm 93 is defined at an angle at which the idle wheels 97 are positioned forward of the wheels 92. The stopper 180 is an example of a "swing angle defining structure".

Moreover, in the third modified example, the arms 93 are applied with the weight balance structure 170. The weight balance of the arms 93 is adjusted by the weight balance structure 170 so as to apply a swinging force in the arrow R direction to the arms 93. The weight balance structure 170 is an example of a "swinging force application structure".

As illustrated in FIG. 21, when the flying machine 160 moves toward the vertical face 65, the swing angle of the arms 93 is defined by the stopper 180, and the idle wheels 97 are positioned forward of the wheels 92. Accordingly, the idle wheels 97 can be made to contact the vertical face 65 reliably.

On the other hand, when the idle wheels 97 have contacted the vertical face 65, the arms 93 swing in the opposite direction to the arrow R direction accompanying contact of the idle wheels 97 against the vertical face 65. Then, in a state in which the wheels 92 and the idle wheels 97 are pressed against the vertical face 65, a moment acts on the arms 93 as a result of the weight balance structure 170. A swinging force in the arrow R direction is thereby applied to the arms 93, thus maintaining the state in which the idle wheels 97 are pressed against the vertical face 65.

Applying the stopper 180 and the weight balance structure 170 in this manner enables the swing angle of the arms 93 to be defined, and enables the arms 93 to be applied with a swinging force, using a simple structure.

Fourth Modified Example

Figure 22:
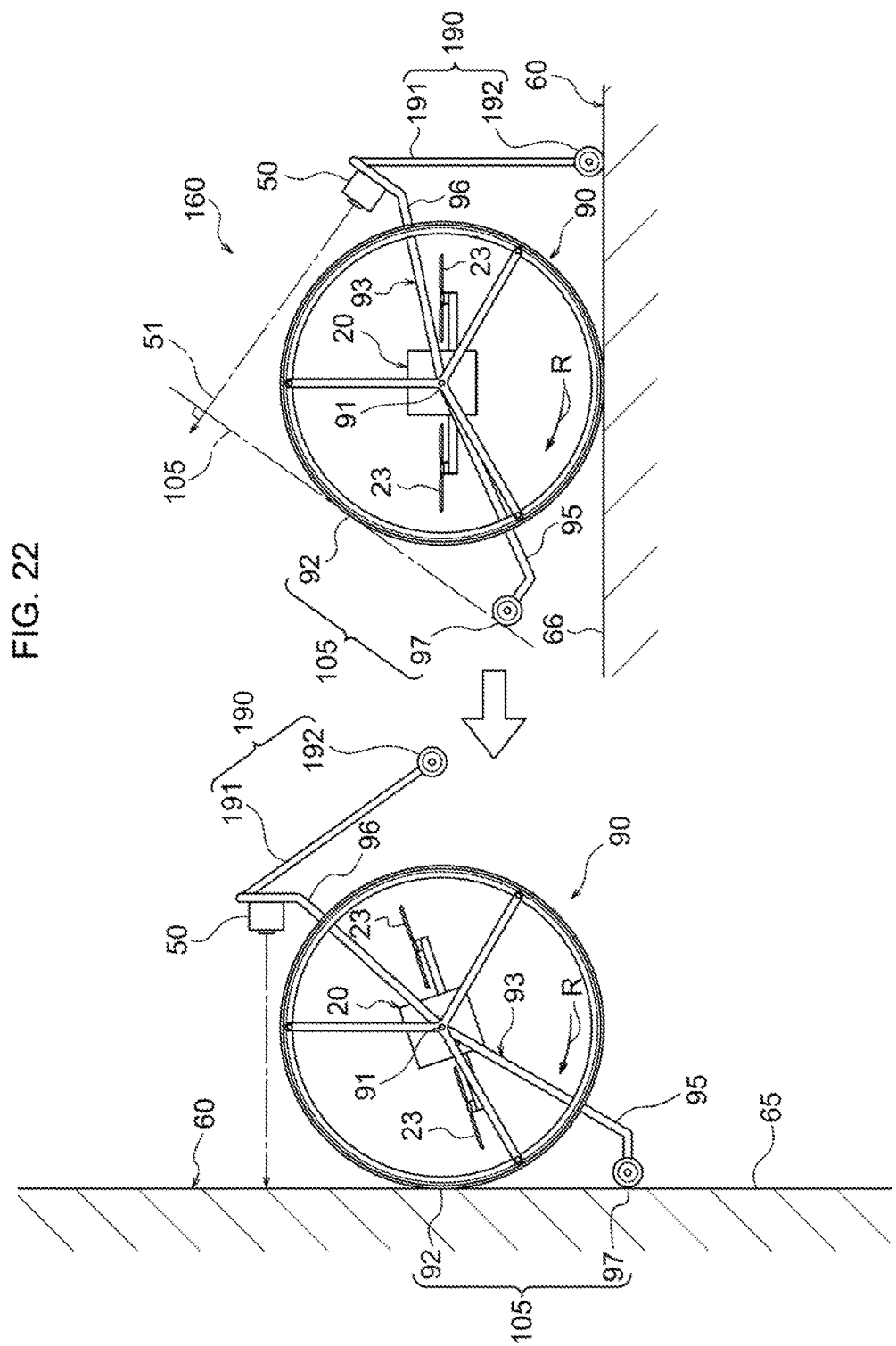
FIG. 22 is a diagram illustrating a fourth modified example of a flying machine according to the sixth exemplary embodiment.

In a fourth modified example illustrated in FIG. 22, a stopper structure 190 is provided to the arms 93. The stopper structure 190 includes arms 191 extending downward from leading end portions of the respective second arm portions 96, and support wheels 192 provided at lower end portions of the respective arms 191. The stopper structure 190 has a predetermined weight, and a swinging force in the arrow R direction is applied to the arms 93 as a result of a moment acting on the arms 93 due to the weight of the stopper structure 190.

Moreover, when the flying machine 160 is moving across a horizontal face 66, the support wheels 192 contact the horizontal face 66, such that the arms 191 place the arms 93 in a swing-restricted state. In this state, the swing angle of the arms 93 is defined at an angle at which the idle wheels 97 are positioned forward of the wheels 92.

On the other hand, when the idle wheels 97 make contact with the vertical face 65, the arms 93 are swung in the opposite direction to the arrow R direction accompanying contact of the idle wheels 97 against the vertical face 65. When this occurs, the stopper structure 190 moves in a direction to come away from the horizontal face 66, thereby permitting swinging of the arms 93.

Moreover, in a state in which the wheels 92 and the idle wheels 97 are pressed against the vertical face 65, a moment acts on the arms 93 due to the weight of the stopper structure 190, thereby applying a swinging force in the arrow R direction to the arms 93. The idle wheels 97 are thus maintained in the state pressed against the vertical face 65. The stopper structure 190 is an example of a "swing angle defining structure" and a "swinging force application structure".

Applying the stopper structure 190 in this manner enables the swing angle of the arms 93 to be defined, and enables the arms 93 to be applied with a swinging force, using a simple structure.

Fifth Modified Example

Figure 23:
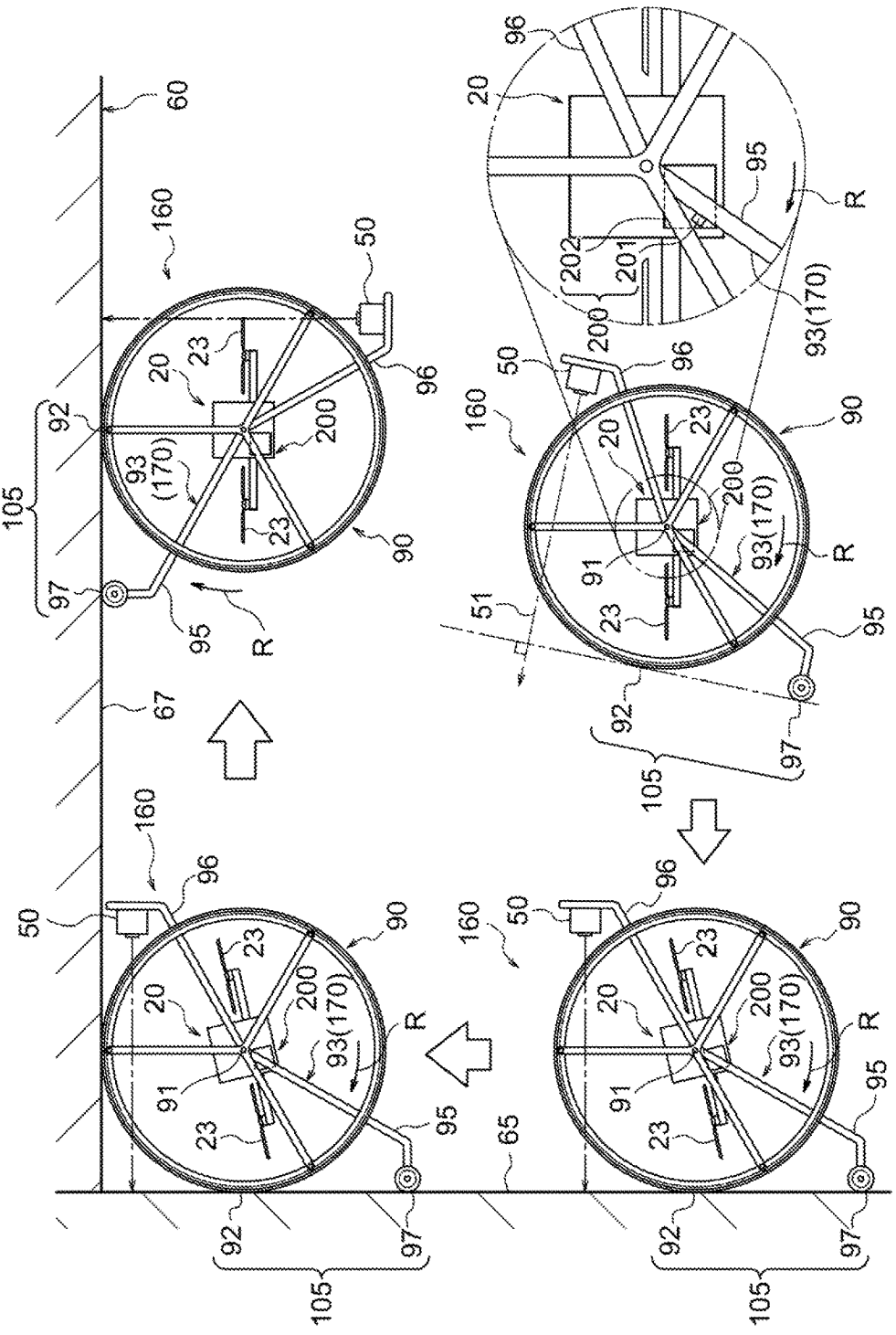
FIG. 23 is a diagram illustrating a fifth modified example of a flying machine according to the sixth exemplary embodiment.

In a fifth modified example illustrated in FIG. 23, the flying machine body 20 is provided with a switching structure 200. The switching structure 200 includes a projecting stopper 201 and an actuator 202 that switches the stopper 201 between a projecting position and a recessed position.

In the switching structure 200, when the stopper 201 is at the projecting position, the stopper 201 gets in the way of the arm 93 to give a state in which swinging of the arms 93 in the arrow R direction is restricted. In this state, the swing angle of the arms 93 is defined at an angle at which the idle wheels 97 are positioned forward of the wheels 92. On the other hand, when the stopper 201 is at the recessed position, a state is adopted in which swinging of the arms 93 in the arrow R direction is permitted. The switching structure 200 is an example of a "swing angle defining structure".

Moreover, in the fifth modified example, similarly to in the third modified example described above, the arms 93 are applied with the weight balance structure 170. The weight balance of the arms 93 is adjusted by the weight balance structure 170 so as to apply a swinging force in the arrow R direction to the arms 93.

Moreover, as illustrated in FIG. 23, when the flying machine 160 moves toward the vertical face 65, the swing angle of the arms 93 is defined by the stopper 201, and the idle wheels 97 are positioned forward of the wheels 92. Accordingly, the idle wheels 97 can be made to contact the vertical face 65 reliably.

On the other hand, when the idle wheels 97 have contacted the vertical face 65, the arms 93 swing in the opposite direction to the arrow R direction accompanying contact of the idle wheels 97 against the vertical face 65. Then, in a state in which the wheels 92 and the idle wheels 97 are pressed against the vertical face 65, a moment acts on the arms 93 as a result of the weight balance structure 170. A swinging force in the arrow R direction is thereby applied to the arms 93, maintaining the state in which the idle wheels 97 are pressed against the vertical face 65.

Moreover, when the flying machine 160 transitions from a state ascending the vertical face 65 to a state moving horizontally along a horizontal face 67, the actuator 202 actuates, placing the stopper 201 in the retracted position, and permitting swinging of the arms 93 in the arrow R direction.

Moreover, when the flying machine 160 moves horizontally along the horizontal face 67, the arms 93 swing in the arrow R direction to give a state in which the wheels 92 and the idle wheels 97 are pressed against the horizontal face 67. When this occurs, a moment acts on the arms 93 as a result of the weight balance structure 170. A swinging force in the arrow R direction is thereby applied to the arms 93, maintaining the state in which the idle wheels 97 are pressed against the horizontal face 67.

Applying the switching structure 200 and the weight balance structure 170 in this manner enables the camera 50 to be made to face the target object straight on, whether the target object is the vertical face 65 or the horizontal face 67.

Note that in the fifth modified example, the actuator 202 may be omitted from the switching structure 200, and switching between the projecting position and the retracted position of the stopper 201 may be performed manually.

Sixth Modified Example

Figure 24:
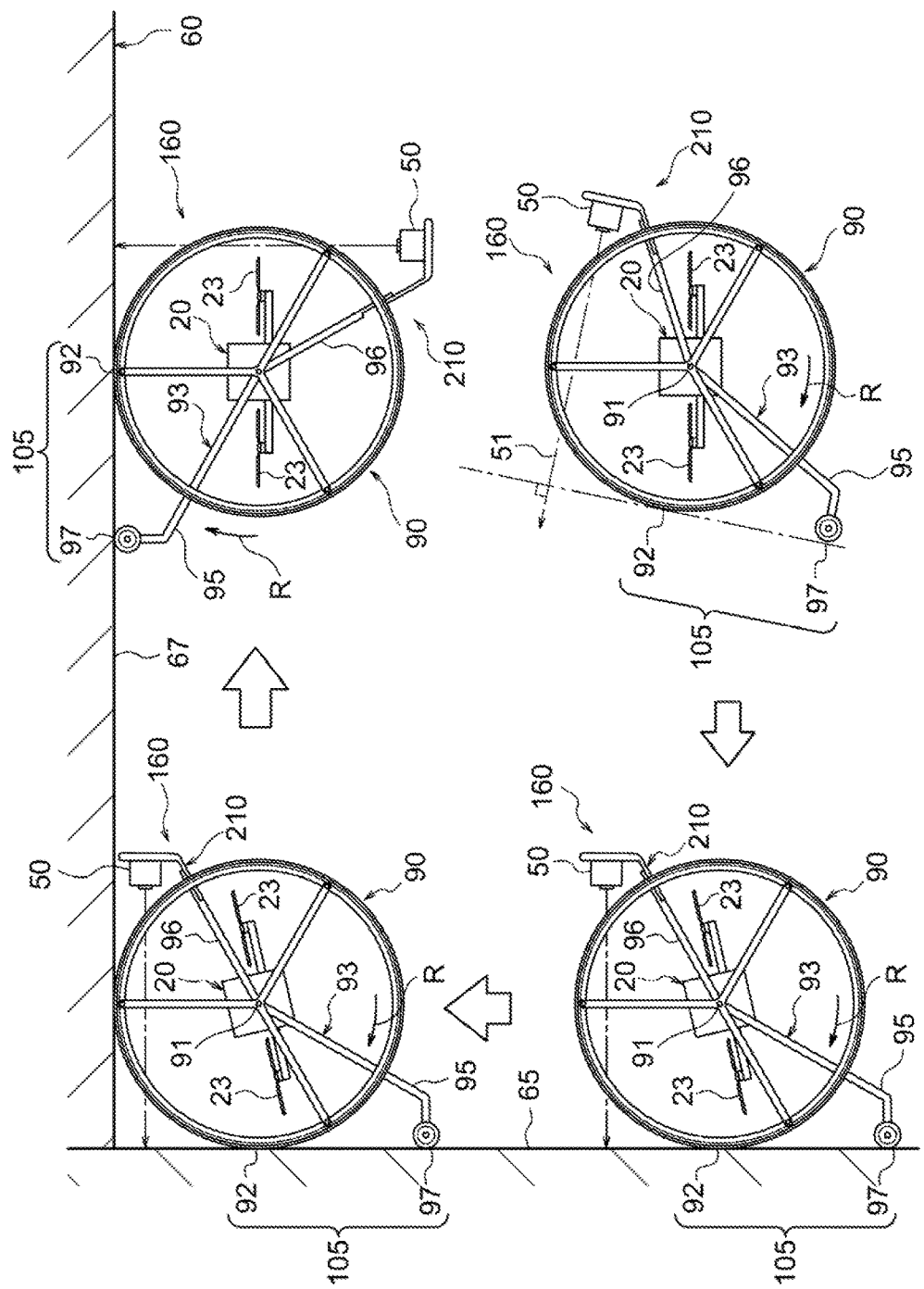
FIG. 24 is a diagram illustrating a sixth modified example of a flying machine according to the sixth exemplary embodiment.

In a sixth modified example illustrated in FIG. 24 and FIG. 25, the second arm portion 96 is applied with an extendable mechanism 210. Namely, due to applying the second arm portion 96 with the extendable mechanism 210, each second arm portion 96 includes an arm body 211, a slide arm 212, and an actuator 213.

The slide arm 212 is provided on a leading end side of the arm body 211, and slides in the length direction of the arm body 211. The camera 50 is fixed to the slide arm 212. The actuator 213 is actuated in order to slide the slide arm 212. The second arm portion 96 is extended and retracted by sliding the slide arm 212.

In the extendable mechanism 210, when the second arm portions 96 are stowed away, moments acting on the first arm portions 95 and the second arm portions 96 cancel each other out, and the swing angle of the arms 93 is defined such that the idle wheels 97 are positioned forward of the wheels 92. On the other hand, when the second arm portions 96 are extended, the moment acting on the second arm portions 96 increases, and a swinging force in the arrow R direction is applied to the arms 93. The extendable mechanism 210 is an example of a "swing angle defining structure" and a "swinging force application structure".

Moreover, as illustrated in FIG. 24, when the flying machine 160 moves toward the vertical face 65, the second arm portions 96 are placed in a stowed state by the extendable mechanism 210, and the idle wheels 97 are positioned forward of the wheels 92. Accordingly, the idle wheels 97 can be made to contact the vertical face 65 reliably.

On the other hand, when the idle wheels 97 have contacted the vertical face 65, the arms 93 swing in the opposite direction to the arrow R direction accompanying contact of the idle wheels 97 against the vertical face 65. Then, in a state in which the wheels 92 and the idle wheels 97 are pressed against the vertical face 65, a moment acts on the second arm portions 96. A swinging force in the arrow R direction is thereby applied to the arms 93, maintaining the state in which the idle wheels 97 are pressed against the vertical face 65.

Moreover, when the flying machine 160 moves horizontally along the horizontal face 67, the actuator 213 actuates, placing the second arm portion 96 in an extended state. The moment acting on the second arm portion 96 accordingly increases, and a swinging force in the arrow R direction is applied to the arms 93. The arms 93 then swing in the arrow R direction, placing the wheels 92 and the idle wheels 97 in a state pressed against the horizontal face 67. When this occurs, the moment acting on the second arm portion 96 applies a swinging force in the arrow R direction to the arms 93, maintaining the state in which the idle wheels 97 are pressed against the horizontal face 67.

Applying the extendable mechanism 210 in this manner enables the camera 50 to be made to face the target object straight on whether the target object is the vertical face 65 or the horizontal face 67.

Note that in the sixth modified example, the following configuration may be adopted instead of splitting the second arm portion 96 into the arm body 211 and the slide arm 212. Namely, as illustrated in FIG. 26, the slide arm 212 may be provided added onto the leading end side 96A of the second arm portion 96. Moreover, as illustrated in FIG. 27, the leading end side 96A of the second arm portion 96 may be bent to an acute angle, and the slide arm 212 may be provided added onto the leading end side 96A of the second arm portion 96.

Moreover, in the sixth modified example, the actuator 213 may be omitted from the extendable mechanism 210, and sliding of the slide arm 212 may be performed manually.

Seventh Modified Example

Figure 28:
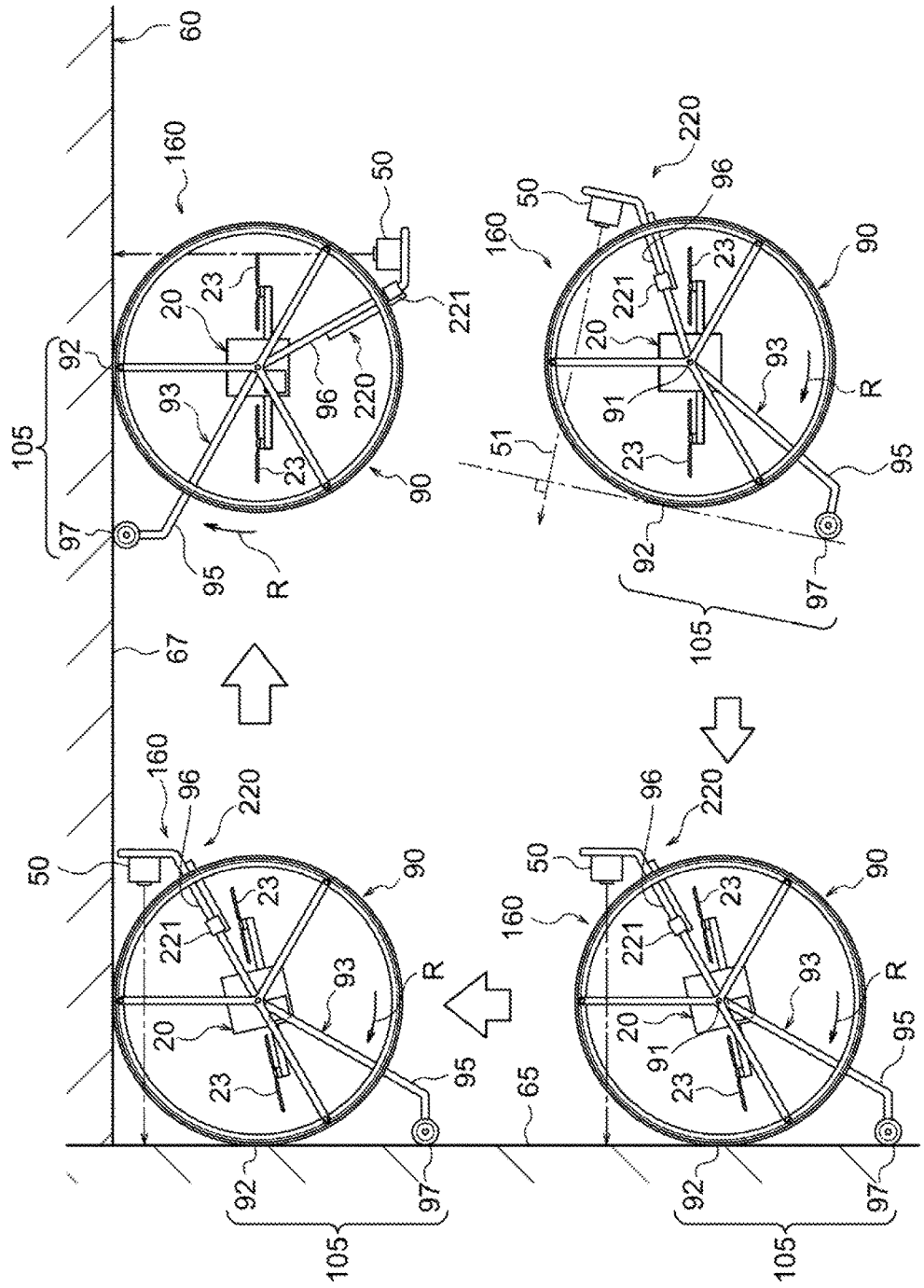
FIG. 28 is a diagram illustrating a seventh modified example of a flying machine according to the sixth exemplary embodiment.
Figure 29:
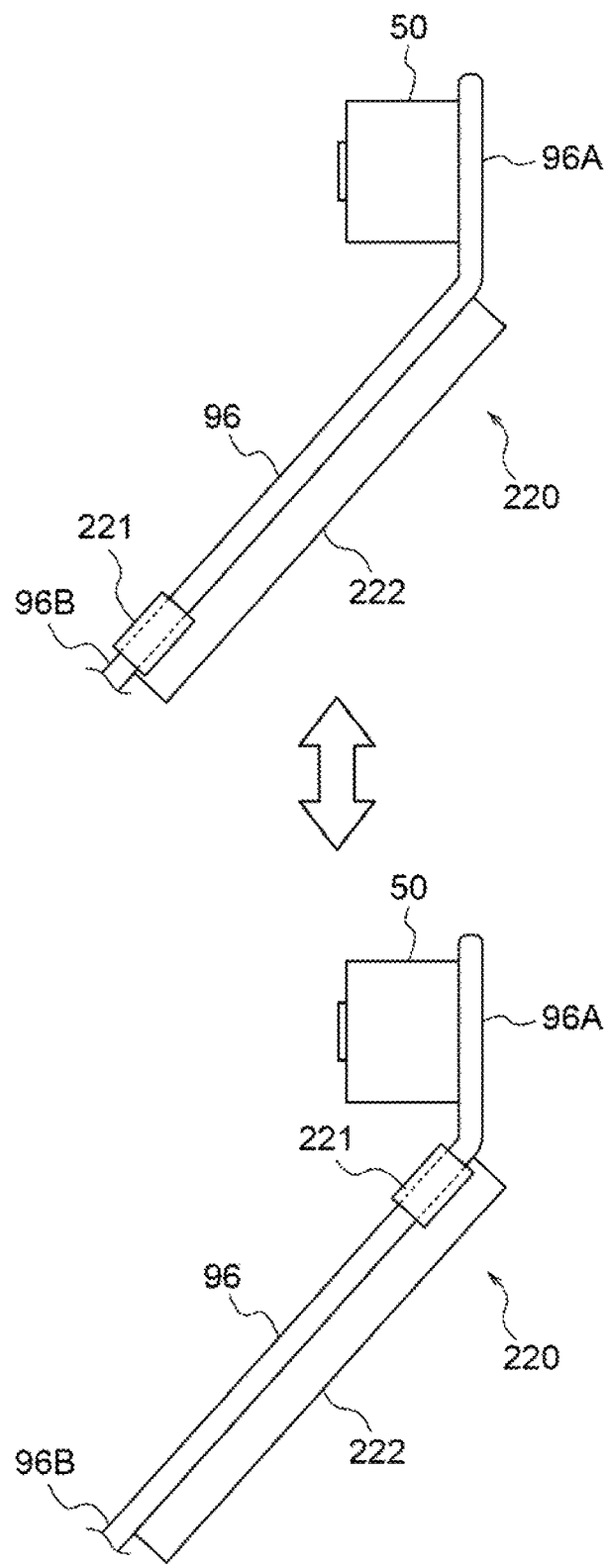
FIG. 29 is an enlargement illustrating a weight mechanism illustrated in FIG. 28.

In a seventh modified example illustrated in FIG. 28 and FIG. 29, the second arm portion 96 is applied with a weight mechanism 220. The weight mechanism 220 includes a weight 221 and an actuator 222. The weight 221 is attached to the second arm portion 96, and is capable of sliding in the length direction of the second arm portion 96. The actuator 222 actuates in order to slide the weight 221.

In the weight mechanism 220, when the weight 221 is positioned at a base end side 96B of the second arm portion 96, moments acting on the first arm portion 95 and the second arm portion 96 cancel each other out, and the swing angle of the arms 93 is defined such that the idle wheels 97 are positioned forward of the wheels 92. On the other hand, when the weight 221 moves to the leading end side 96A of the second arm portion 96, the moment acting on the second arm portion 96 increases, and a swinging force in the arrow R direction is applied to the arm 93. The weight mechanism 220 is an example of a "swing angle defining structure" and a "swinging force application structure".

Moreover, as illustrated in FIG. 28, when the flying machine 160 moves toward the vertical face 65, the weight 221 is positioned at the base end side of the second arm portion 96, and the idle wheels 97 are positioned forward of the wheels 92. Accordingly, the idle wheels 97 can be made to contact the vertical face 65 reliably.

On the other hand, when the idle wheels 97 have contacted the vertical face 65, the arms 93 swing in the opposite direction to the arrow R direction accompanying contact of the idle wheels 97 against the vertical face 65. Then, in a state in which the wheels 92 and the idle wheels 97 are pressed against the vertical face 65, a moment acting on the second arm portions 96 applies a swinging force in the arrow R direction to the arms 93, thereby maintaining the state in which the idle wheels 97 are pressed against the vertical face 65.

Moreover, when the flying machine 160 moves horizontally along the horizontal face 67, the actuator 222 (see FIG. 29) actuates to give a state in which the weight 221 is moved to the leading end side of the second arm portion 96. The moment acting on the second arm portion 96 accordingly increases, and a swinging force in the arrow R direction is applied to the arms 93. The arms 93 then swing in the arrow R direction, placing the wheels 92 and the idle wheels 97 in a state pressed against the horizontal face 67. When this occurs, the moment acting on the second arm portion 96 applies a swinging force in the arrow R direction to the arms 93, maintaining the state in which the idle wheels 97 are pressed against the horizontal face 67.

Applying the weight mechanism 220 in this manner enables the camera 50 to be made to face the target object straight on whether the target object is the vertical face 65 or the horizontal face 67.

Note that in the seventh modified example, the actuator 222 may be omitted from the weight mechanism 220, and sliding of the weight 221 may be performed manually.

Other Modified Examples

In the sixth exemplary embodiment described above, the frame body 91 is applied with an axle shaft as an example. However, the frame body 91 may be applied with a cage-shaped structure similarly to in the first to the fifth exemplary embodiments described above.

Moreover, in the sixth exemplary embodiment described above, a pair of the arms 93 are employed. However, configuration may be made with a single arm 93.

Moreover, in the sixth exemplary embodiment described above, the idle wheels 97 are provided at the leading end portions of the arms 93. However, the idle wheels 97 may be omitted, and the leading end portions of the arms 93 may be pressed against the target object directly.

Moreover, in the sixth exemplary embodiment described above, the arms 93 swing. However, the arms 93 may be fixed at a preset angle such that the idle wheels 97 and the wheels 92 are pressed against the target object at the same time.

Moreover, in the sixth exemplary embodiment described above, configuration capable of being combined with the first to the fifth exemplary embodiments described above may be combined as appropriate.

Explanation has been given regarding the first to sixth exemplary embodiments of technology disclosed herein. However, the technology disclosed herein is not limited thereto, and obviously various other modifications may be implemented within a range not departing from the spirit of the technology disclosed herein.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A flying machine comprising:
   a flying machine body including a rotor blade;
   a frame including a frame body supporting the flying machine body, and a pair of pressing sections, each of which is provided at a width direction side of the frame body and is pressed against a target object at least at two locations separated along a direction orthogonal to a width direction of the frame body; and
   a detector fixed to the frame, and having a detection direction that is a direction orthogonal to a direction joining the two locations together and facing toward the target object.

2. The flying machine of claim 1, wherein:
   the frame body supports the flying machine body such that the flying machine body is capable of rotating about the width direction of the frame body;
   a pair of looped members are each provided at a respective width direction end portion of the frame body, each of the looped members forming a looped polygonal shape about the width direction of the frame body; and
   each of the pair of pressing sections includes at least one out of a plurality of sides of the respective looped members.

3. The flying machine of claim 2, wherein:
   a plurality of pulleys disposed spaced apart around the width direction of the frame body is provided at each respective width direction end portion of the frame body; and
   each of the looped members is a looped belt entrained around the plurality of pulleys.

4. The flying machine of claim 3, wherein the frame body includes a plurality of coupling rods that each respectively couple the plurality of pulleys provided to one width direction end portion of the frame body to the plurality of pulleys provided to the other width direction end portion of the frame body.

5. The flying machine of claim 4, wherein the frame body includes:
   a central support rod that extends in the width direction of the frame body, and that supports the flying machine body such that the flying machine body is capable of rotating about the width direction of the frame body; and
   a plurality of side face support rods that respectively extends from each end portion of the central support rod in directions orthogonal to an axial direction of the central support rod, with each plurality of the side face support rods supporting the plurality of coupling rods.

6. The flying machine of claim 5, wherein the detector is fixed to the central support rod.

7. The flying machine of claim 2, wherein:
a plurality of sides of each of the looped members respectively configure different pressing sections; and
a plurality of the detectors are fixed to the frame body so as to respectively correspond to different pressing sections.

8. The flying machine of claim 1, wherein:
the frame body supports the flying machine body such that the flying machine body is capable of rotating about the width direction of the frame body;
a plurality of wheels disposed spaced apart around the width direction of the frame body are provided at each width direction end portion of the frame body; and
each of the pair of pressing sections includes one pair of wheels out of each plurality of wheels.

9. The flying machine of claim 8, wherein the frame body includes a plurality of coupling rods that each respectively couple the plurality of wheels provided to one width direction end portion of the frame body to the plurality of wheels provided to the other width direction end portion of the frame body.

10. The flying machine of claim 9, wherein the frame body includes:
a central support rod that extends in the width direction of the frame body, and that supports the flying machine body such that the flying machine body is capable of rotating about the width direction of the frame body;
a plurality of side face support rods that respectively extends from each end portion of the central support rod in directions orthogonal to an axial direction of the central support rod, with each plurality of the side face support rods supporting the plurality of coupling rods; and
a pair of looped members that are each provided at a respective width direction end portion of the frame body, each of the looped members forming a looped polygonal shape about the width direction of the frame body, and connecting respective leading end portions of the plurality of side face support rods together.

11. The flying machine of claim 10, wherein:
the frame body includes a coupling-and-fixing rod that couples the pair of looped members together; and
the detector is fixed to the coupling-and-fixing rod.

12. The flying machine of claim 1, wherein the flying machine body is enclosed by the frame.

13. The flying machine of claim 1, wherein the detector is enclosed by the frame.

14. The flying machine of claim 1, wherein
the frame body supports the flying machine body such that the flying machine body is capable of rotating about the width direction of the frame body;
a pair of looped members are each provided at a respective width direction end portion of the frame body, each forming a looped polygonal shape about the width direction of the frame body; and
the flying machine body is positioned inside the looped members when the frame is viewed from the side.

15. The flying machine of claim 14, wherein the looped members form polygonal shapes having four or more sides.

16. The flying machine of claim 1, wherein:
a pair of wheels are provided at each respective width direction end portion of the frame body;
an arm that swings about the width direction of the frame body is supported by the frame body;
each of the pair of pressing sections includes one of the wheels and a leading end portion of the arm; and
the detector is fixed to the arm.

17. The flying machine of claim 16, further comprising a swing angle defining structure that defines a swing angle of the arm.

18. The flying machine of claim 16, further comprising a swinging force application structure that applies a swinging force to the arm such that the leading end portion of the arm is pressed against the target object.

19. A method for using a flying machine, the method comprising employing the flying machine of claim 1 to perform at least one out of imaging, observing, recording, examining, inspecting, conveying, coating, marking, or another operation, while moving the flying machine along the target object which is at least one out of a bridge, a building, a tunnel, a roof, a ladder, a utility pole, a chimney, a large passenger aircraft, another structure, a ground surface, or a water surface.

20. A flying machine frame comprising:
a frame body that supports a flying machine body including a rotor blade;
a pair of pressing sections, each of which is provided at a width direction side of the frame body and is pressed against a target object at least at two locations separated along a direction orthogonal to a width direction of the frame body; and
a fixing section that is provided to the frame body, and to which a detector is fixed with a detection direction of the detector being a direction orthogonal to a direction joining the two locations together and facing toward the target object.

\* \* \* \* \*